Oct. 3, 1967   R. M. ULRICH   3,344,540
UNIVERSAL LOAD HANDLING APPARATUS
Filed Dec. 19, 1963   12 Sheets-Sheet 12
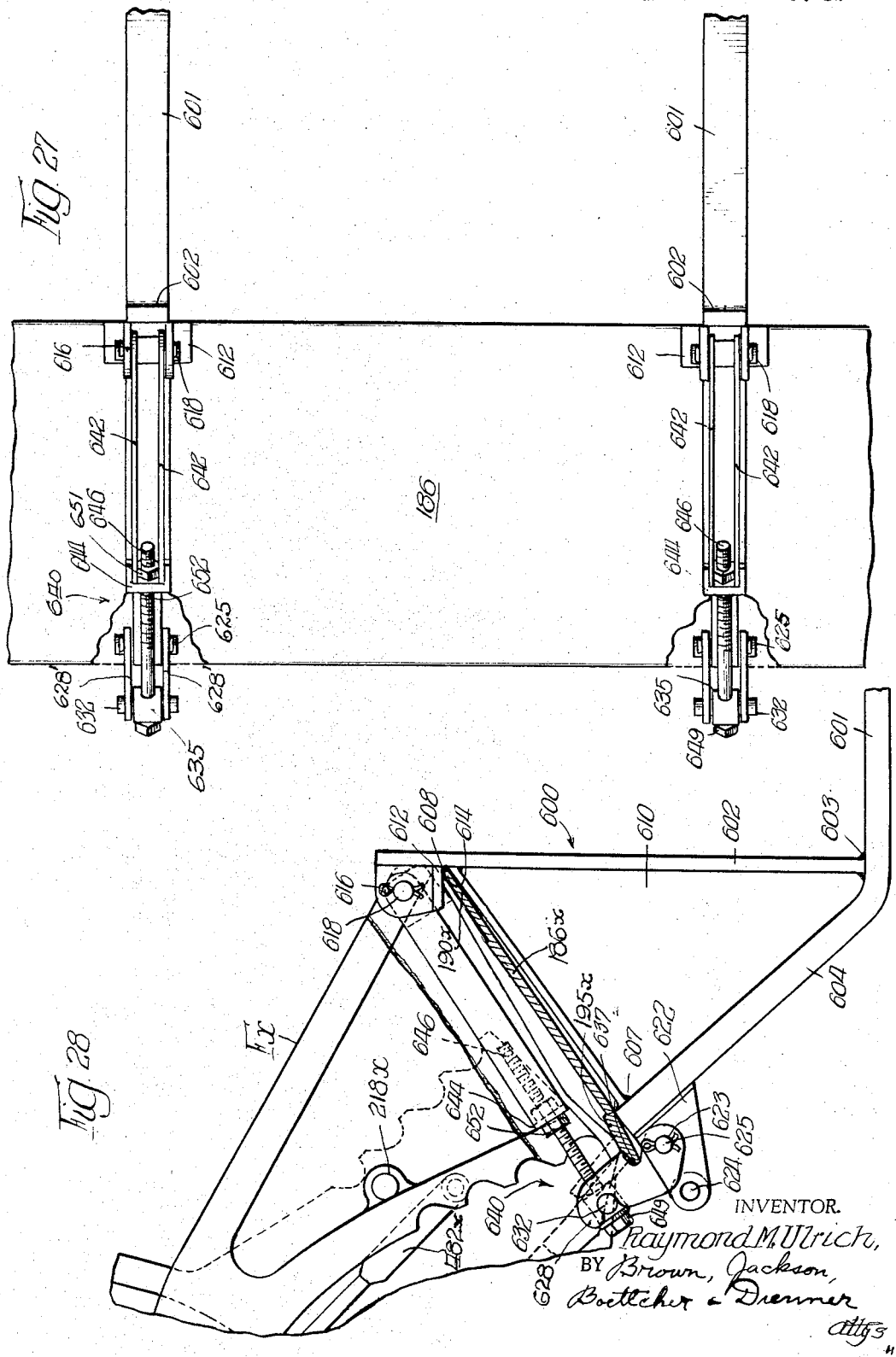
INVENTOR.
Raymond M. Ulrich,
BY Brown, Jackson,
Boettcher & Dienner
Attys

United States Patent Office 3,344,540
Patented Oct. 3, 1967

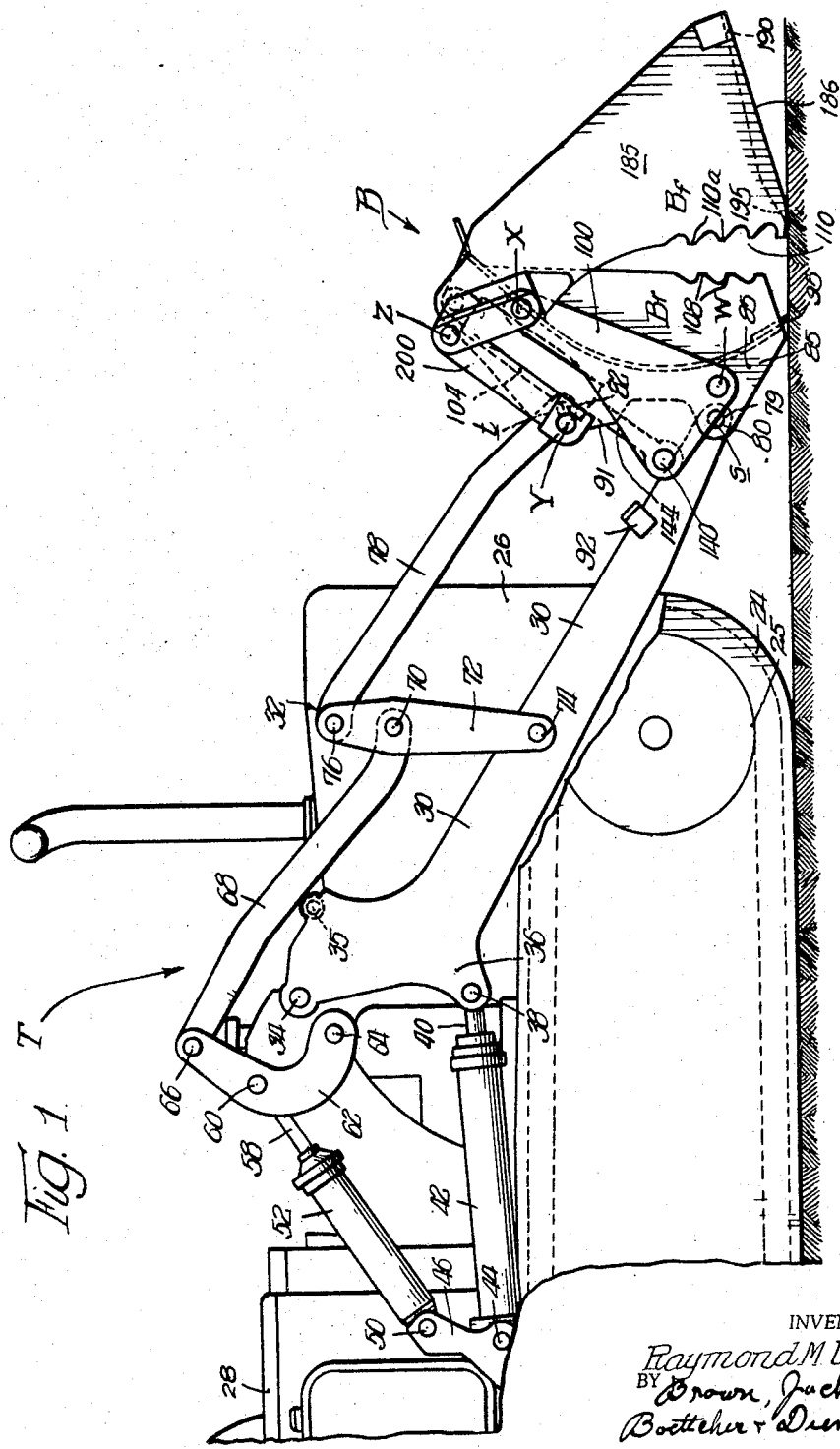

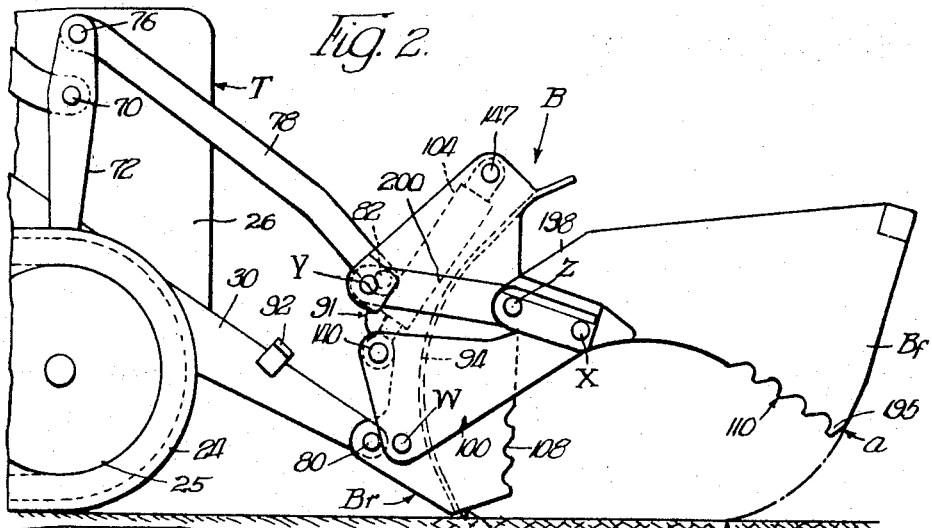
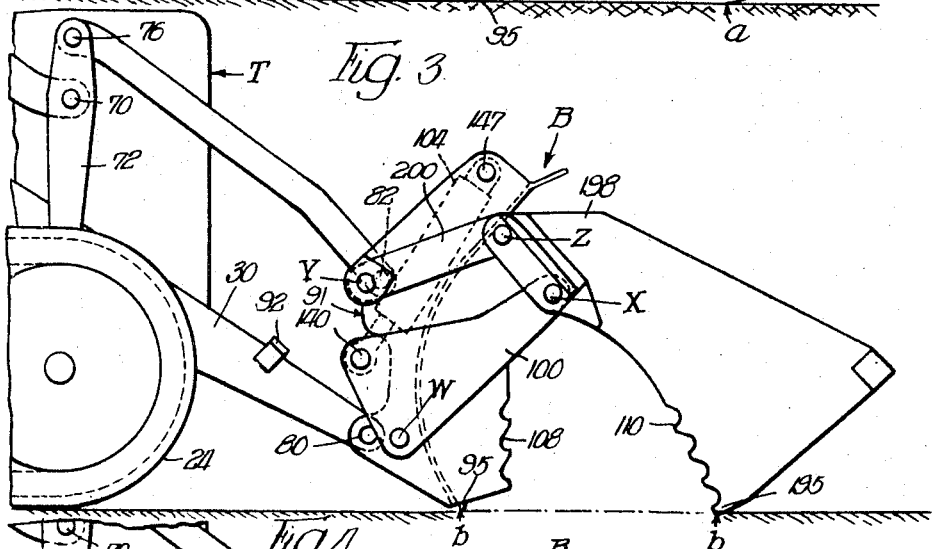
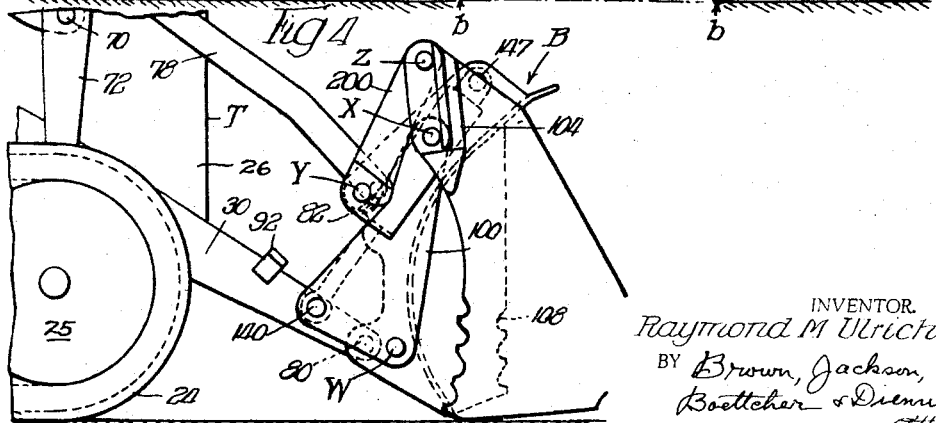

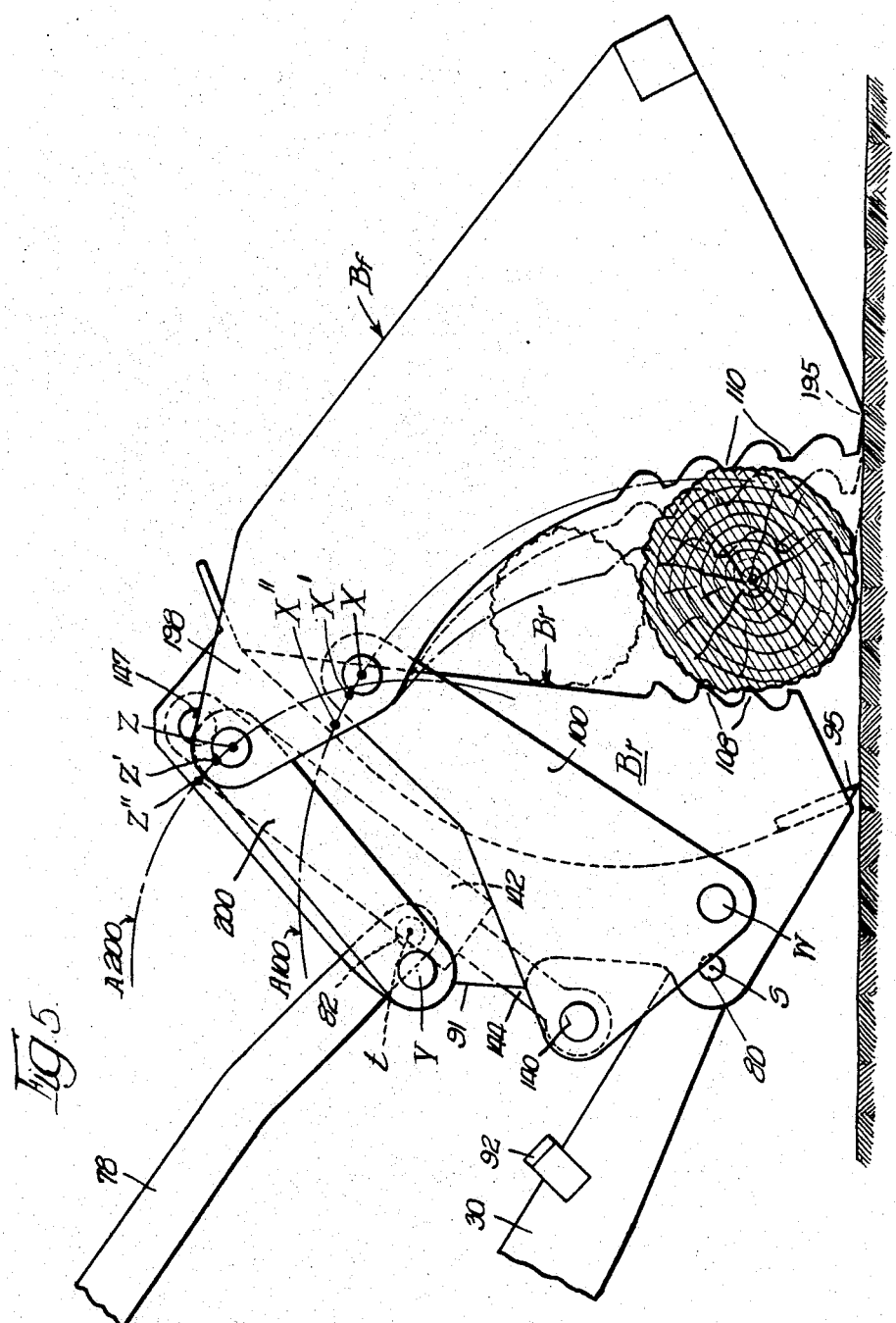

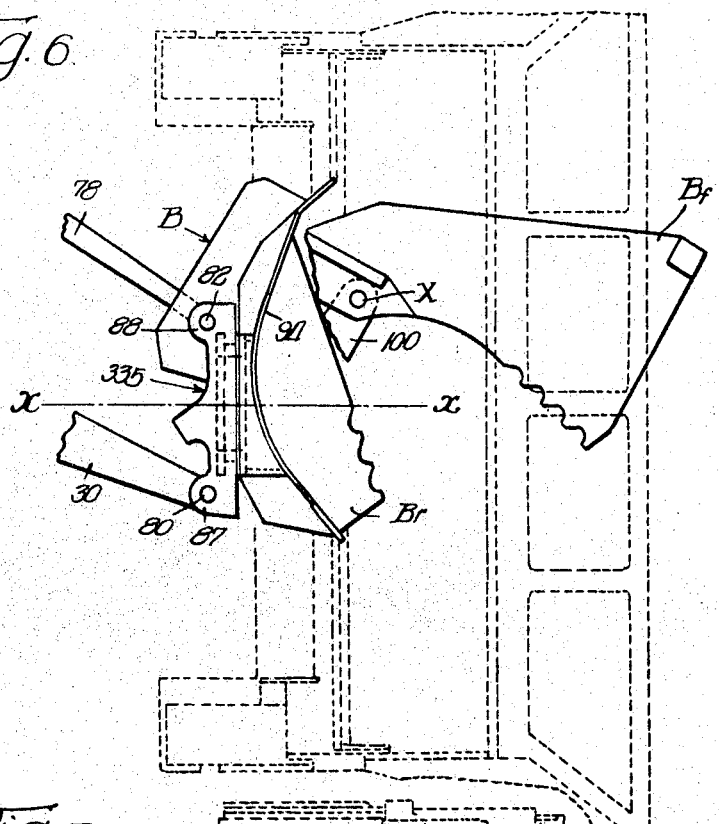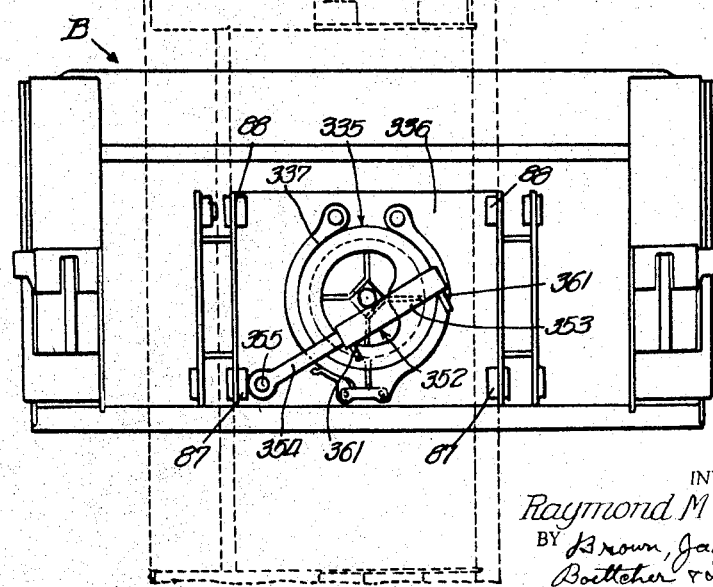

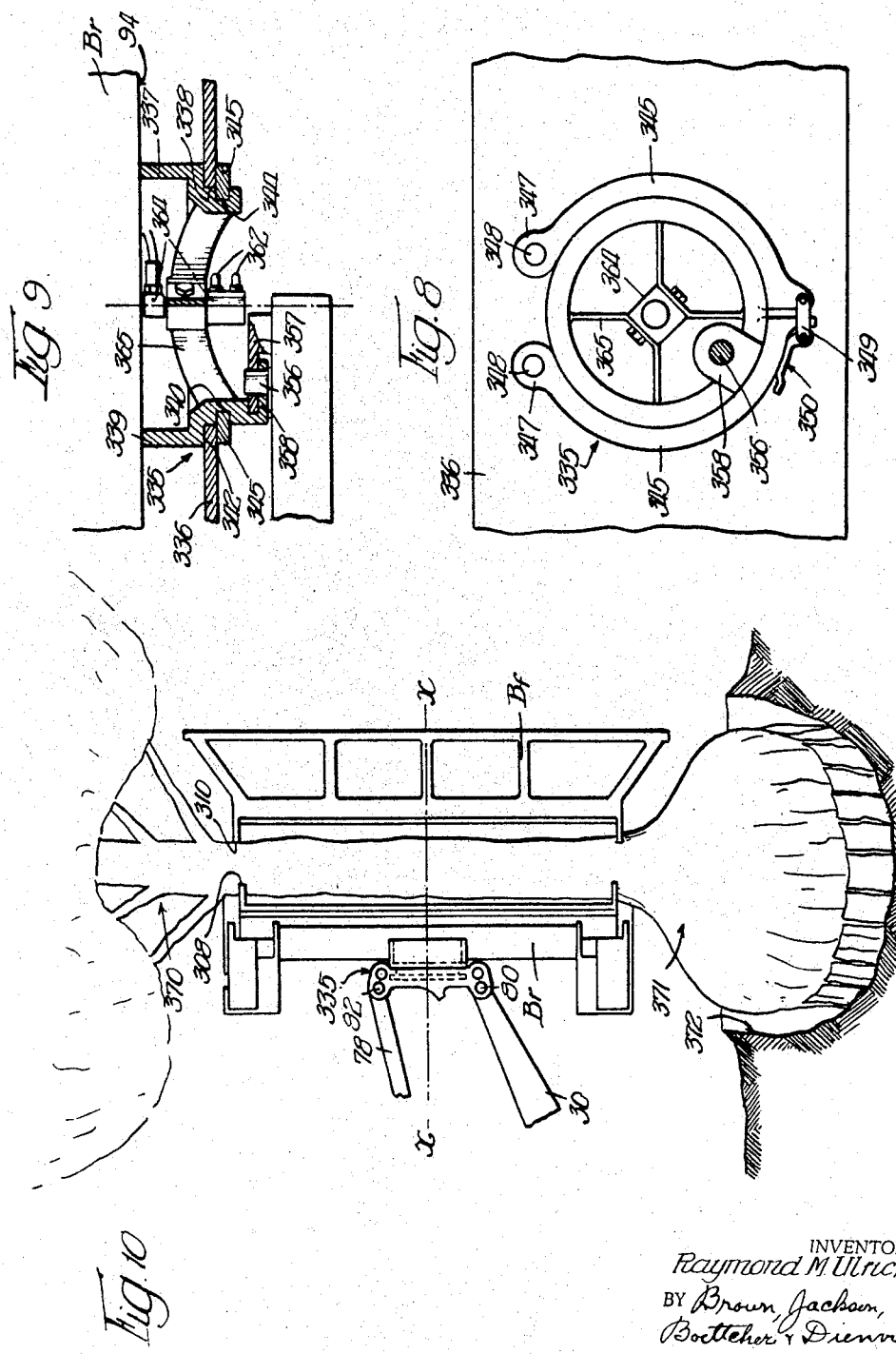

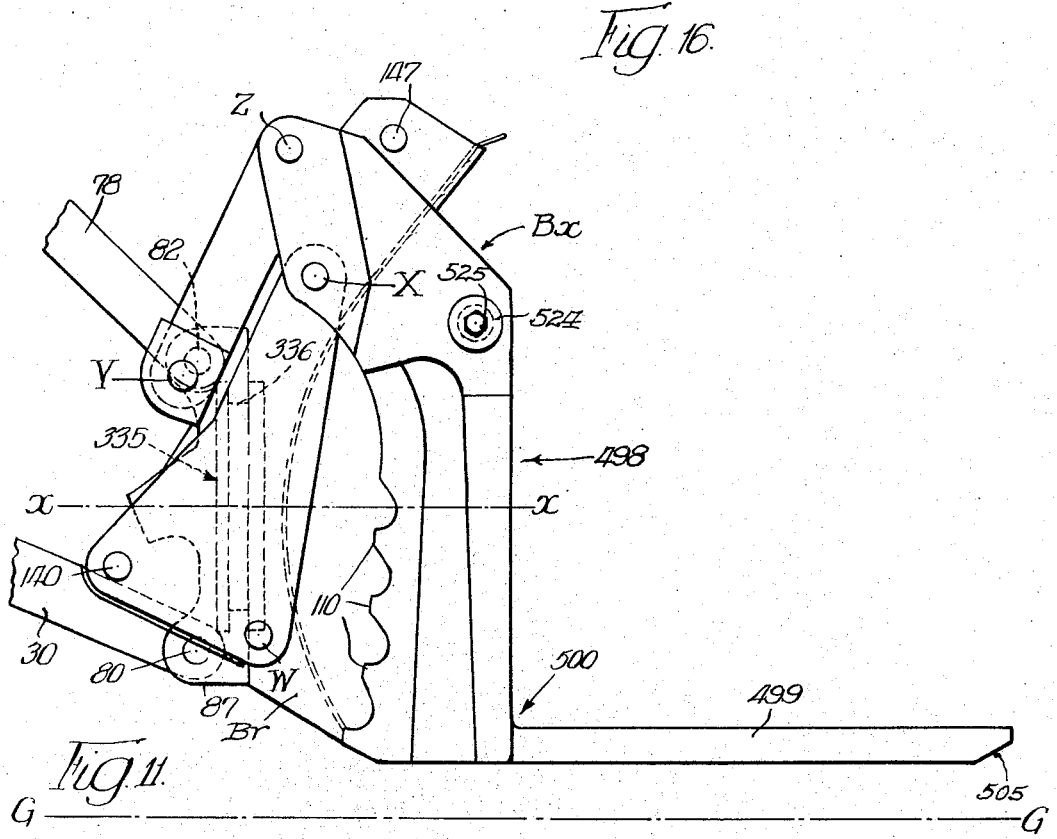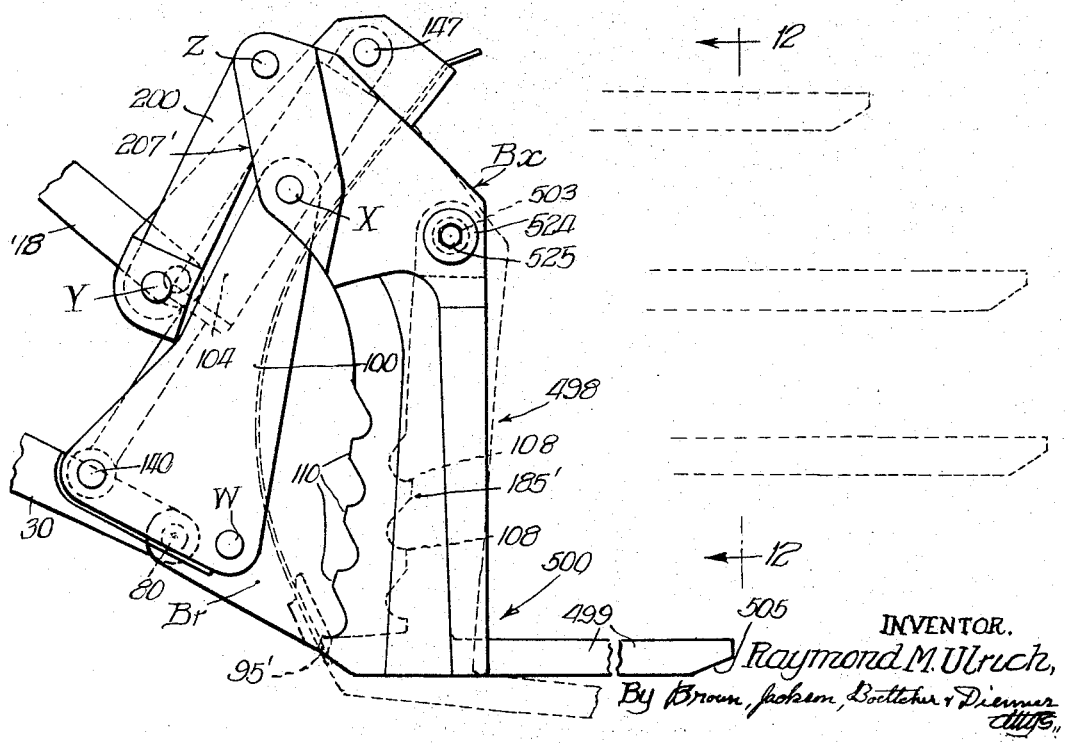

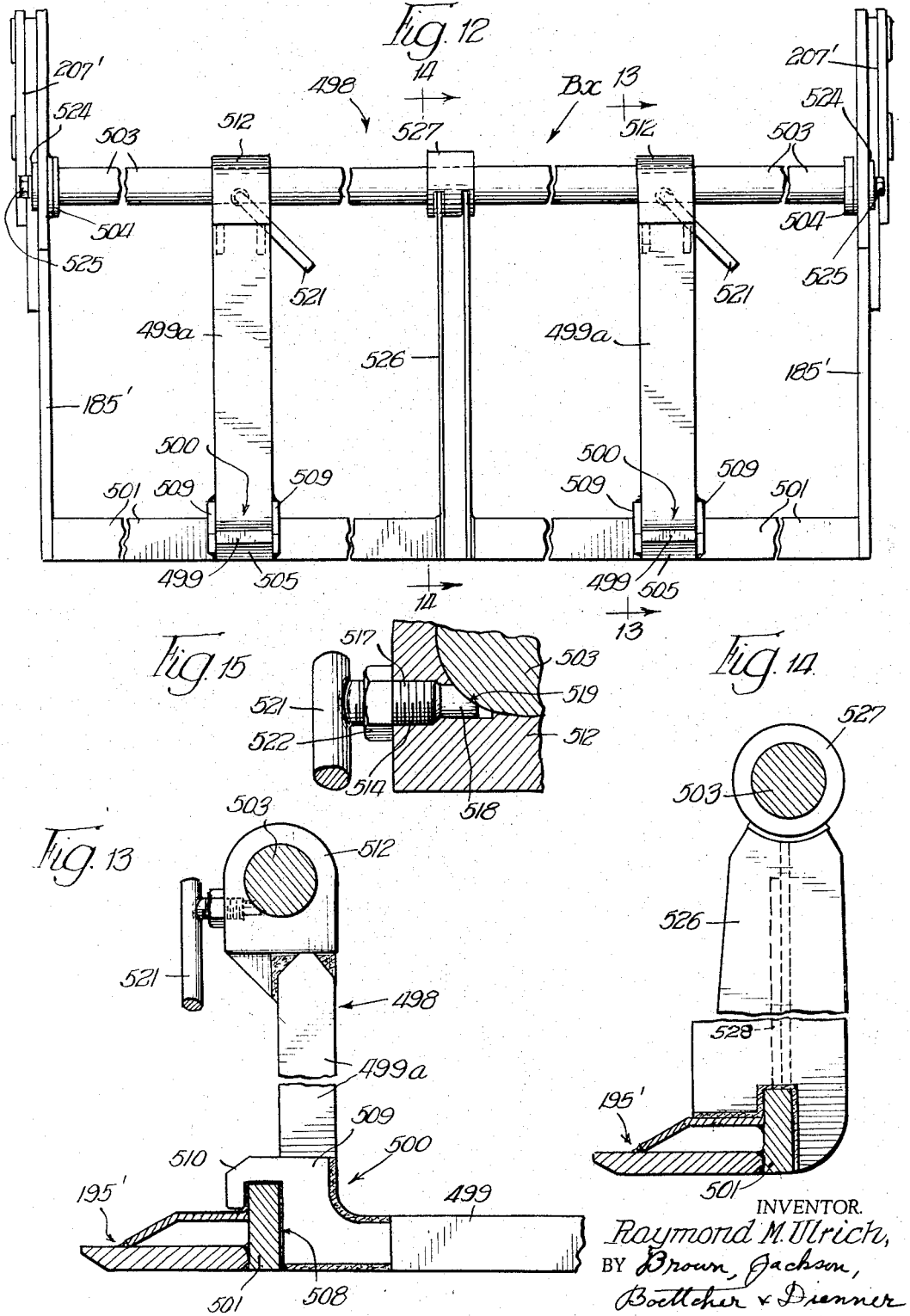

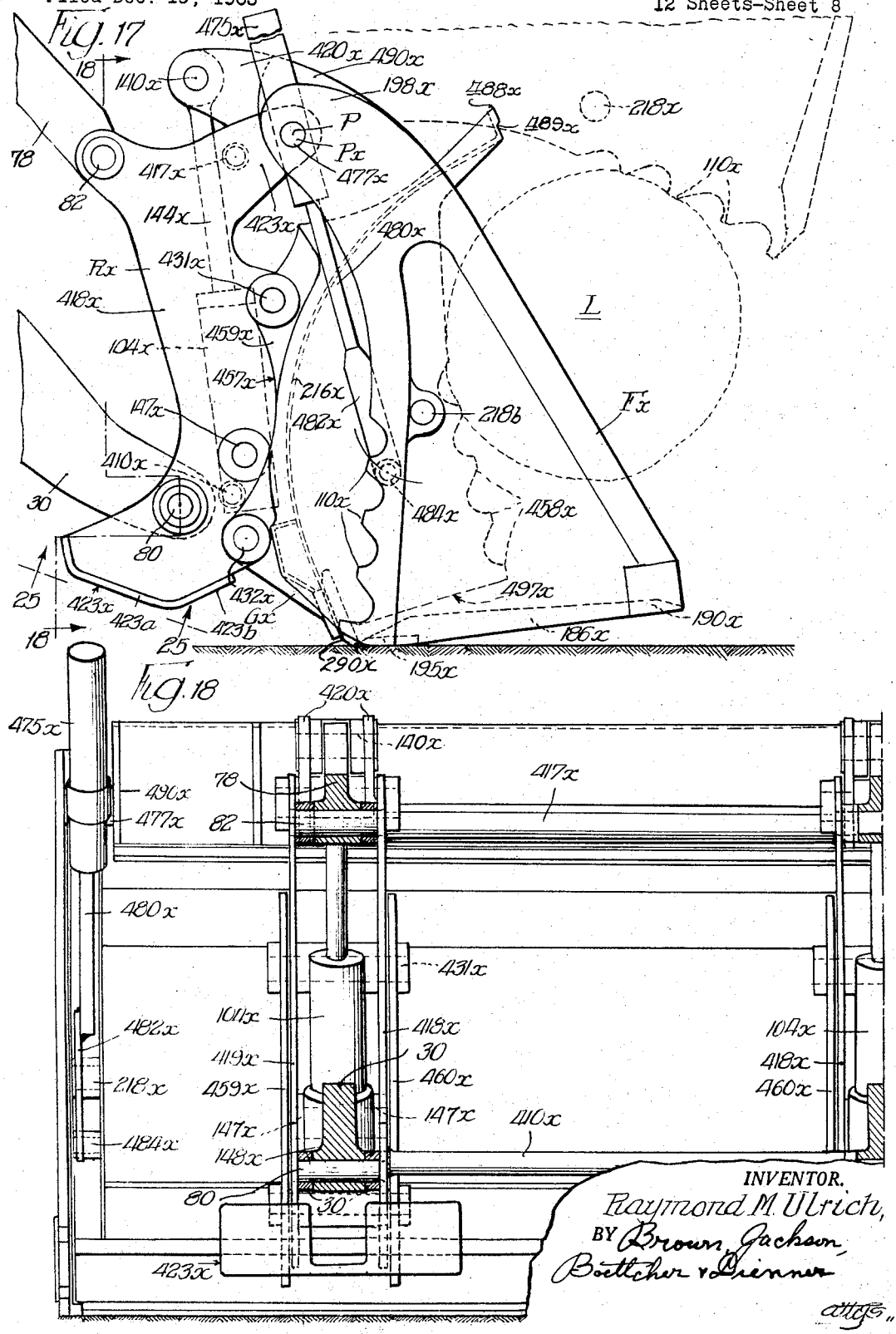

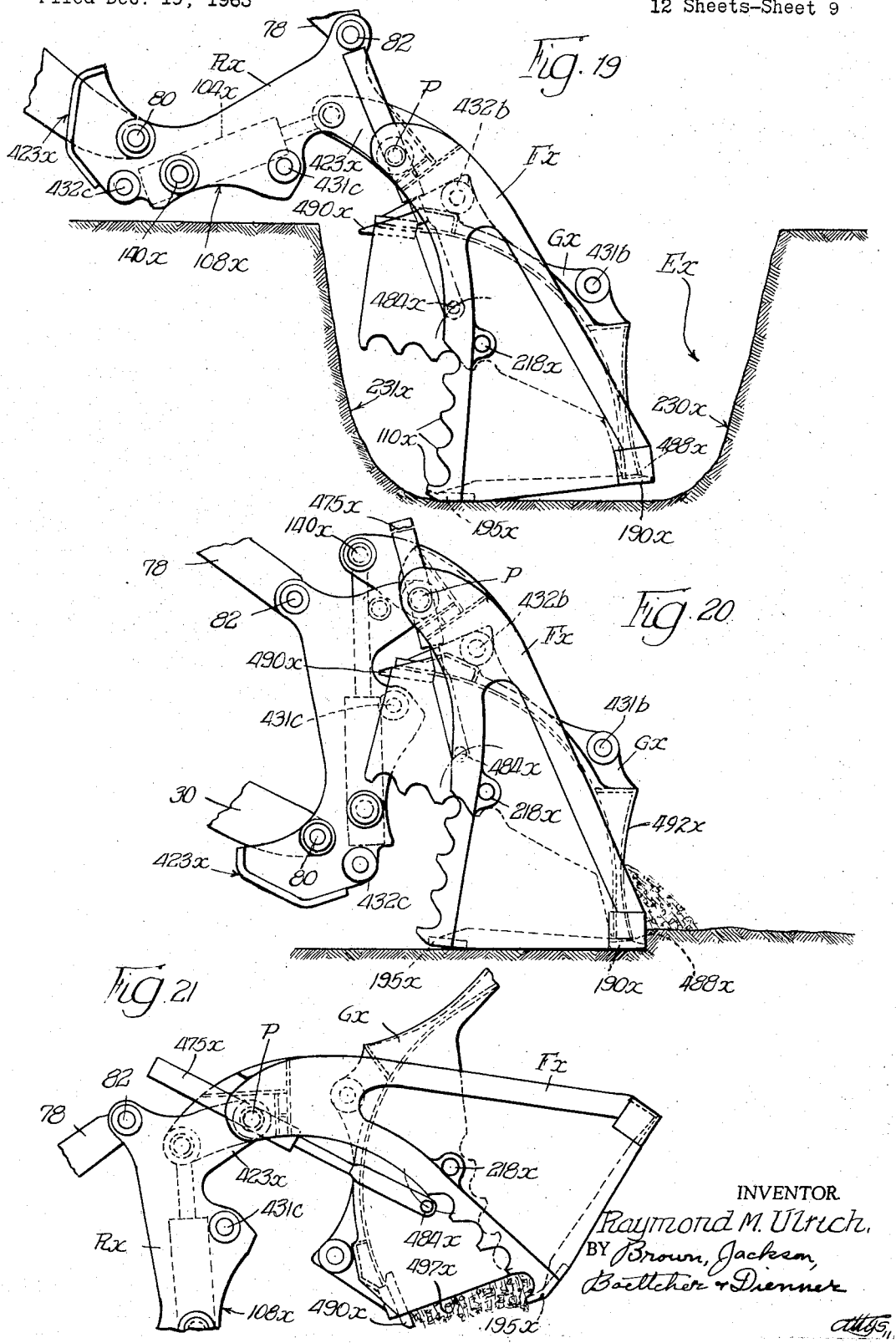

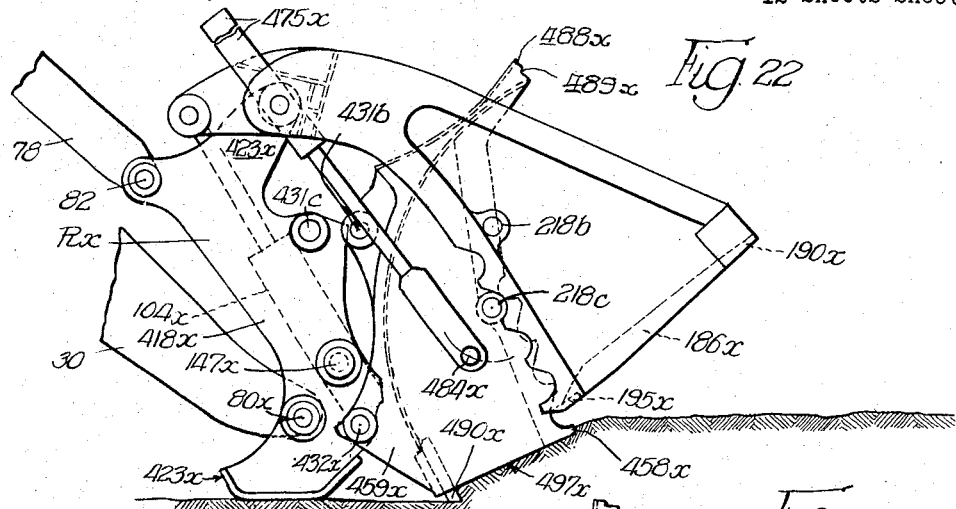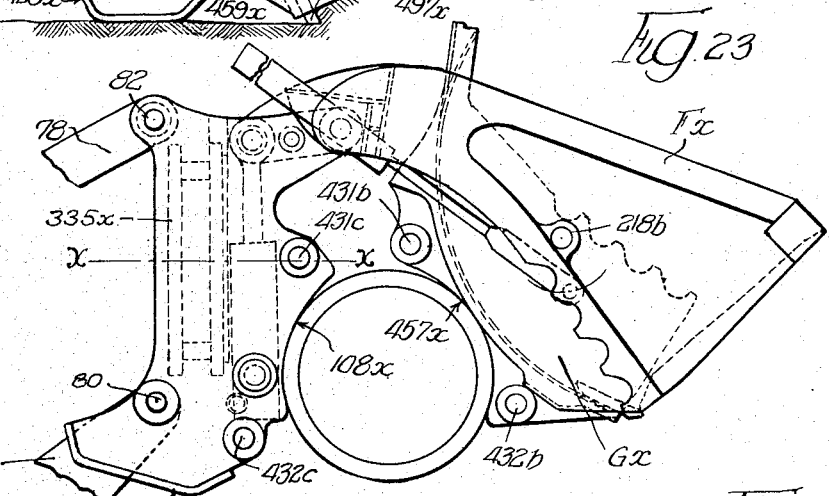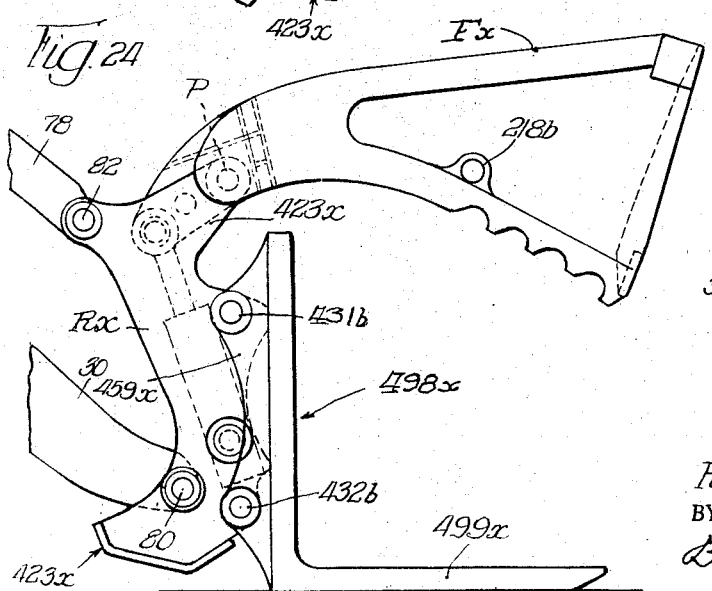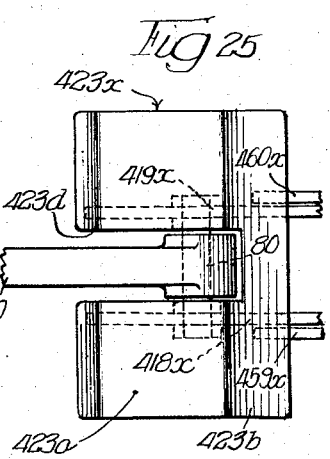

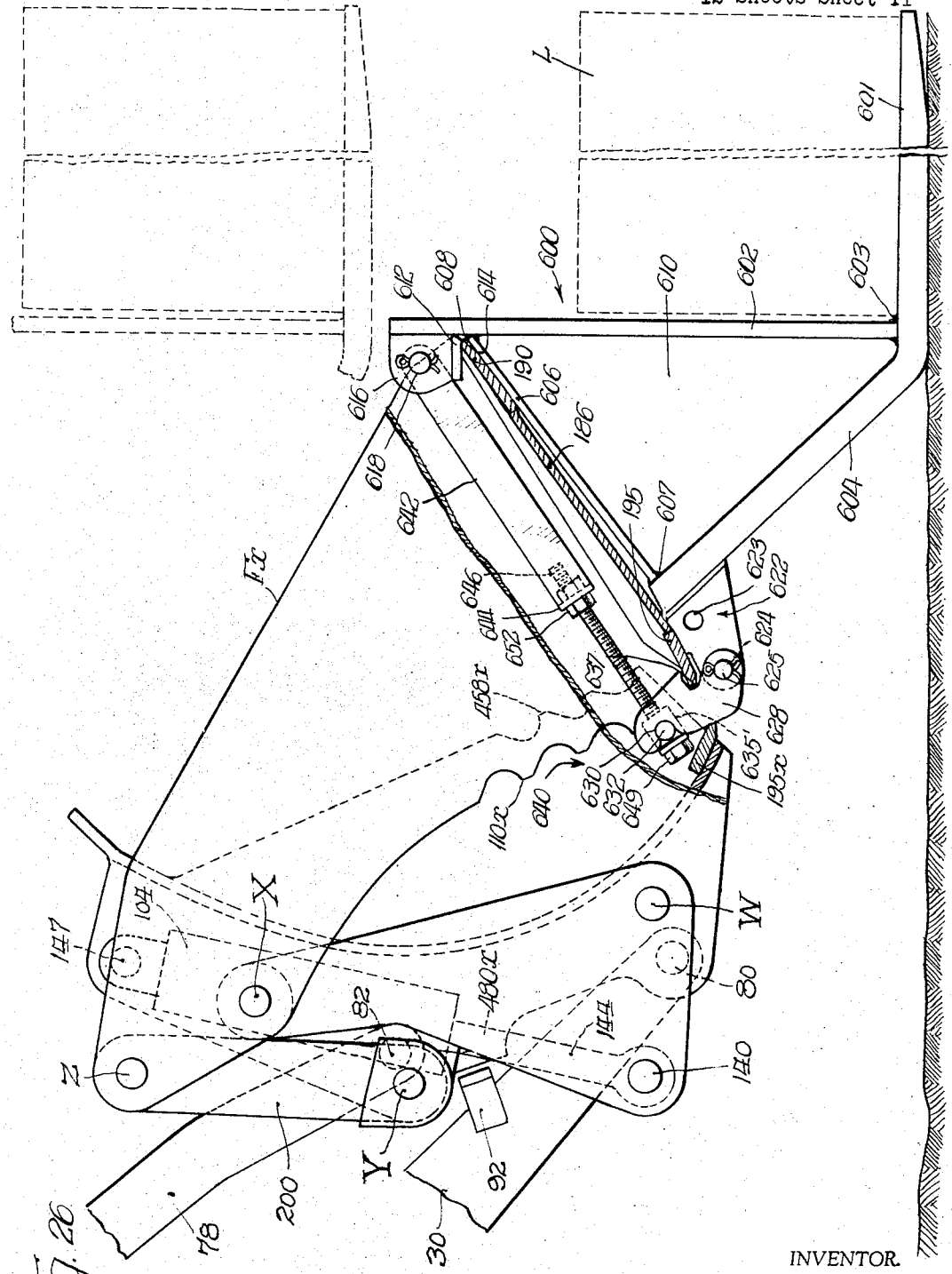

3,344,540
UNIVERSAL LOAD HANDLING APPARATUS
Raymond M. Ulrich, Roanoke, Ill., assignor to Ulrich Manufacturing Co., Roanoke, Ill., a corporation of Delaware
Filed Dec. 19, 1963, Ser. No. 331,794
7 Claims. (Cl. 37—117.5)

The present application is directed to improved universal load handling apparatus adapted for mounting on a tractor or other self-propelled vehicle, and is a continuation-in-part of my prior co-pending application Ser. No. 174,311 filed Feb. 19, 1962, now Patent No. 3,243,-905.

This improved load handling apparatus is characterized by its ability to perform universal or multiple functions typically represented by: (1) a bucket function for picking up, transporting, and for dumping dirt, gravel, rocks, etc.; (2) a bull-dozing function for bull-dozing earth, gravel, and other relatively loose materials; (3) grading and scraping functions for leveling soils and for picking up and spreading soils; and (4) a grappling function utilizing power operated grappling jaws for picking up tree stumps, logs, railroad ties, posts, pipes, etc. The basic structure of this load handling apparatus comprises a multiple or two-section unit made up of a front load handling section and a rear load handling section which are movably connected together for relative opening and closing movements therebetween. This multiple-section unit is adapted for raising and lowering movement in its mounting on the outer ends of power operated lifting and lowering arms extending outwardly from a tractor; and the multiple section unit is also adapted for power operated tilting movement in a pivotal mounting on the outer ends of the lifting and lowering arms.

One of the objects of the present invention is to provide the above described type of load handling apparatus with an improved fork lift function obtained by providing a plurality of fork lift arms projecting from one of the load handling sections.

In one embodiment of the invention, this fork lift device is in the form of a separate fork lift attachment which is adapted to be substituted for the front load handling or bucket section of the basic combination when it is desired to perform a fork lifting function.

In another embodiment of the invention, the fork lift apparatus is in the form of a separate fork lift attachment adapted to be substituted for an intermediate load handling section associated with the rear load handling section, so that the fork tines project forwardly from such rear section.

In another embodiment of the invention, the fork lift apparatus is adapted to have attachment mounting on the front edge of the front bucket section, thereby obviating the necessity of removing either the front bucket section or the intermediate section when it is desired to have a fork lifting action.

In all three of the above fork lift arrangements, the fork tines are made capable of a wide range of adjusting movementss, either in a vertical direction, in a horizontal direction, in an angular tipping direction, or in a swiveling direction about a substantially fore and aft axis. These different adjustments are all power operated, such as through the power operated lifting and lowering arms, the power operated tilting mechanism for tilting the unit at the outer ends of the arms, the power operated mechanism for causing relative opening and closing movements between the front and rear load handling sections, and the power operated swiveling mechanism.

Another object of the invention is to provide a further improved embodiment characterized by three load handling or material handling sections. That is to say, this three-section embodiment comprises, in addition to the aforementioned front and rear material handling sections, a third intermediately disposed section which can function alternately with either the front section or the rear section in performing the different earth moving operations, different grappling functions, and other different load handling functions. This three section embodiment can likewise have the aforementioned fork lift feature adapted thereto, preferably in the form of an intermediate material handling section having fork lift tines projecting forwardly therefrom. This latter fork lift apparatus can also be given each of the power operated adjustments above described.

This improved three-section embodiment also has other operating advantages and structural advantages which will be set forth more clearly in the later detailed description thereof.

Referring now to the accompanying drawings illustrating these different embodiments:

FIGURE 1 is a side elevational view showing the basic form of my improved load handling apparatus mounted upon a crawler tread type of tractor;

FIGURES 2, 3 and 4 are fragmentary side elevational views, similar to the front part of FIGURE 1, showing the bucket in three successive closing stages of one type of earth moving operation;

FIGURE 5 is a side elevational view showing the front and rear sections in the performance of a grappling operation;

FIGURE 6 is a diagrammatic side view showing the improved load handling apparatus or bucket mounted on a swivel joint permitting angular swiveling thereof;

FIGURE 7 is a rear elevational view of the bucket and this swiveling joint mounting;

FIGURE 8 is a rear elevational view of the swivel joint on a larger scale;

FIGURE 9 is a fragmentary sectional view through the swivel joint;

FIGURE 10 is a diagrammatic view showing how the swivel joint enables the apparatus to operate vertically in uprooting a tree or in planting a tree;

FIGURE 11 is a fragmentary side elevational view illustrating my above basic form of load handling apparatus provided with the aforementioned fork lift attachment projecting forwardly from the front end of the load handling apparatus, this view showing the apparatus and fork lift in a lowered position, and also illustrating projected and retracted positions of the fork tines as the fork lift is moved upwardly;

FIGURE 12 is a fragmentary front elevational view of the fork lift attachment, taken approximately on the plane of the projection line 12—12 of FIGURE 11;

FIGURE 13 and 14 are fragmentary transverse sectional views taken on the planes of the section lines 13—13 and 14—14 of FIGURE 12;

FIGURE 15 is a fragmentary detail section transversely of the upper portion of FIGURE 13;

FIGURE 16 shows this same general construction of fork lift attachment mounted for swiveling movement on a swivel embodiment of load handling apparatus or assembly;

FIGURE 17 is a side elevational view of the improved three-section embodiment of my invention, characterized by the addition of an intermediate section or swinging gate member to the front and rear sections;

FIGURE 18 is a rear view of the above, partly in elevation and partly in section, corresponding to a view taken on the plane of the line 18—18 of FIGURE 17.

FIGURE 19 is a diagrammatic view showing the intermediate or swinging closure gate section in its operation of closing the open front of the front bucket section during trenching or other soil moving operations;

FIGURE 20 is a side elevational view showing such three-section embodiment performing a bull-dozing or forward scraping operation;

FIGURE 21 shows such embodiment performing an overhead dumping operation for dumping a load;

FIGURE 22 shows such embodiment in the performance of a grading or scraping operation performed primarily by the intermediate or swinging gate section;

FIGURE 23 shows the performance of a grappling operation by approximately the above embodiment, differing slightly therefrom by the addition of the aforementioned swivel joint which permits the swiveling of the grappling jaws into different angles;

FIGURE 24 shows still another form of fork lift attachment for adaptation to this later three-section embodiment of material handling apparatus;

FIGURE 25 is a fragmentary bottom or underside elevational view of one of the skid shoes at the bottom of the rear grappling section, as viewed approximately from the plane of the line 25—25 of FIGURE 17;

FIGURE 26 is a fragmentary view, partly in elevation and partly in section, showing another embodiment of fork lift attachment which can be quickly and easily mounted on the front bucket section of the two section embodiment disclosed in FIGURES 1–10, or on the front bucket section of the three-section embodiment disclosed in FIGURES 17–25, this FIGURE 26 illustrating such multiple unit fork lift mounted on the two-section embodiment of FIGURE 1–10;

FIGURE 27 is a fragmentary plan view showing two of these fork lift units mounted at spaced points across the front bucket section; and FIGURE 28 is a fragmentary view similar to FIGURE 26, showing the fork lift unit adjusted to be mounted on a narrower fore-and-aft depth of front bucket section, such as on a narrow bucket section of the three-section embodiment of FIGURES 17–25.

In order to completely explain the full utility and all of the operating advantages of the improvement subject matter disclosed in this application, particularly as it is regarded as distinguishing from or supplementing the disclosure of my prior co-pending application, it will be necessary to briefly describe the basic structure of this co-pending application. For example, a full understanding of the operation and range of adjustments of the three or more forms of fork lift mechanism shown for example in FIGURES 11–16, in FIGURE 24 and in FIGURES 26–28, it is necessary to understand the basic structures of the two-section load handling unit and also of the three-section load handling unit.

Referring first to the two-section and with particular reference to FIGURES 1–5, this unit comprises a two-section bucket, designated B in its entirety, which is shown as being mounted on the front end of a crawler tread type of tractor designated T in its entirety. The tractor shown is of the full crawler type having endless crawler treads 24 traveling over the usual front and rear sprocket wheels and intervening idler rollers associated with the tread frames 25. These treads and tread frames are spaced outwardly from the main frame or body 26 of the tractor to permit the interposition of the bucket lifting arms therebetween. The tractor has the conventional power plant and high pressure hydraulic supply system for energizing the hydraulic controls under the control of the operator seating on the operator's seat 28, all of which is old and well known.

The bucket B is supported at the front end of the tractor T by right and left support arms 30 and by right and left sets of tilting linkage 32, these being disposed on opposite sides of the tractor in the vertical planes of the spaces lying between the thread frames 25 and the tractor body 26. Each of the right and left lifting and lowering arms 30 has fulcrum mounting at its rear end on a transverse pivot pin 34 having fixed axis support on the tractor body or frame 26. Forwardly of the fixed axis fulcrum mounting 34, these two lifting arms 30 are cross connected by a transverse tubular brace bar 35, which compels substantially simultaneous movement of the two lifting arms. Projecting from the underside of each support arm 30 approximately below the fulcrum axis 34 is a clevis-type of pivot lug 36 carrying a transverse pivot pin 38 to which the forward end of a piston rod 40 is pivotally connected. This piston rod extends from a two-way hydraulic ram cylinder 42 which is pivotally mounted at its rear end on a pivot pin 44 extending transversely through a mounting bracket 46 carried by the tractor frame 26. Hydraulic lines connect to the opposite ends of the ram cylinder 42 for enabling the ram cylinder to transmit a two-way lifting and lowering motion to the lifting and lowering support arm 30.

Referring now to the bucket tilting linkage 32, the same bracket 46 which carries the pivot pin 44 of the lifting and lowering ram 42 also carries at a higher level another transverse pivot pin 50 to which the rear end of a bucket tilting ram cylinder 52 is pivotally mounted. This is likewise a two-way cylinder having hydraulic lines connected to opposite ends thereof, and the piston rod 58 extending from the front end of the cylinder is pivotally connected at 60 to the intermediate portion of an angle-shaped lever 62, the lower end of which has fulcrum mounting on a transverse pivot pin 64 carried by the tractor body at a point slightly below and to the rear of the fulcrum pin 34 of the lifting and lowering arm 30. The opposite or upper end of the angle-shaped lever 62 has pivotal connection through a clevis mounted pin 66 with the rear end of a push-pull link 68 which extends forwardly directly above the lifting and lowering arm 30. The front end of the push-pull link 68 has pivotal connection at 70 with an intermediate point of an upwardly extending lever 72 which has its lower end pivotally mounted at 74 on the lifting and lowering arm 30. The upper end of the lever 72 is pivotally connected at 76 with another forwardly extending push-pull link 78. The lever 72 is made up of laterally spaced companion parts welded together at intervals by cross struts, whereby the lower portion of the lever has clevis-like spaced side arms embracing opposite sides of the lifting and lowering arm 30 for receiving the pivot pin 74, and whereby the two push-pull links 68 and 78 have clevis pivotal mounting at 70 and 76 between the spaced halves of the lever.

The pair of right and left supporting arms 30, 30 at each side of the tractor T constitute power-operated supporting means operative to support the bucket B and to raise and lower it; and the pair of right and left sets of linkage 32 constitute power-operated tilting mechanism for tilting the bucket B in its entirety relative to the supporting arms 30, 30. Pivot eyes 79 at the ends of the supporting arms 30, 30 mount transverse pivot pins 80 which establish a lower transverse supporting axis $s$ on which the back bucket section is tiltably mounted for fore and aft swinging movement, which swinging movement is determined by the push-pull action of the tilting links 78. The ends of these latter links 78 also have pivot eyes secured thereto which mount transverse pivot pins 82 that establish a tilting axis $t$ with the back bucket section at a point substantially above the lower supporting axis $s$.

It will be evident from the foregoing that the admission of hydraulic pressure to the rear ends of the bucket lifting cylinders 42 will swing the right and left supportings arms 30 upwardly to raise the bucket to an elevated position, as for transporting a load in the bucket to a point of dumping; and it will also be evident that the admission of hydraulic pressure thereafter to the rear ends of the bucket tilting cylinders 52 will operate through the tilting linkage 32 to tilt the bucket in a forward clockwise direction about the lower supporting axis $s$, as for example to dump the load from the bucket at the point of dumping. During this upward swinging movement of the supporting arms 30, 30 to raise the bucket, the bucket tilting linkage 32 will automatically partake of a certain degree of this upward swinging movement by reason of the pivotal mounting of the intermediate motion-transmitting lever 72 at the pivot 74 on the supporting arm 30, and also by reason of the relatively close proximity of the tilting linkage fulcrum center 64 to the lifting arm fulcrum center 34. This insures that in the operation of raising a loaded bucket to an elevated position, either for transport or for dumping, the bucket will not accidentally be tilted to an angle where part or all of its load might be prematurely dumped accidentally.

The right and left supporting pins 80, 80, and the right and left tilting pins 82, 82 have vertically spaced mounting in right and left hinge brackets each of which bracket is made up of a pair of spaced side plates 85, 85 which have welded attachment to the curved back-surface of the rear bucket section, designated Br. The details of these hinge brackets and side plates 85 are fully disclosed in my aforementioned copending application. The back wall of the rear bucket section Br is made up of a large curved plate 94 which carries a transverse cutting bit 95 across its lower edge. Also secured to the convexly curved back surface of the rear bucket section Br, at points located outwardly beyond the hinge brackets 84, 84 are multipurpose bracket structures 91, 91 welded to the lower corners or lower edge of the back plate 94 along the right and left side edges of such plate. These bracket structures 91 perform the multiple functions of: (a) mounting the connecting links 100 and 200 extending between the two bucket sections; (b) mounting on the rear bucket section the hydraulic rams 104 which open and close the bucket; and (c) also mounting on the rear bucket section, along the right and left forward edges thereof, the toothed grappling jaws 108 which co-operate with related grappling jaws 110 extending down along the rearwardly facing side edges of the front bucket section Bf. Extending transversely through the lower portion of each bracket structure 91 is a pin W which functions as the fulcrum mounting for the lower power operated link 100. Mounted on the fulcrum pin W is a welded assembly in the form of a combined hub and crank structure which establishes the fulcrum mounting of the power operated link 100, and which also establishes the crank pin connection between this power link and the associated hydraulic ram 104.

Extending transversely through the hub-crank structure 130 and through the power link 100 is a crank pin 140 which establishes the power transmitting connection between the associated hydraulic ram 104 and the fulcrum mounting W of the front or lower link 100. Rotatably mounted on an inner portion of each crank pin 140 is the pivot eye at the lower end of the hydraulic ram piston rod 144. The upper end of the ram cylinder 142 has a pivot eye having pivotal mounting on an upper transverse pin 147 supported in the upper corners of the spaced bracket plates making up each bracket 91. More specific details of the bracket structures 85 and 91, and of the hub-crank structures 130 and their connections with the hydraulic rams, etc., are set forth in the aforementioned co-pending application. The front power link or lever 100 has its upper or outer end operatively connected with the front bucket section Bf through a swinging, mounting pin X.

Referring now to the mounting of each upper guide link 200 on the rear bucket section Br, the lower or rear end of such upper guide link 200 has pivotal mounting on a relatively fixed mounting pin Y carried by the rear bucket section at a point above the lower mounting pin W. The lower end of the upper guide link 200 extends into a pocket associated with the bracket structure 91, and the pivot pin Y extends through this pocket and through the lower end of the link 200. The front or outer end of this upper guide link 200 is operatively connected with the front bucket section Bf through an upper swinging mounting pin Z carried by the upper bucket section at a point substantially above the lower swinging pivot X. The toothed grappling jaws 108 on the rear bucket section Br have beveled side surfaces adapted to have sliding engagement with the side surfaces with the companion grapping jaws 110 on the front bucket section Bf, whereby to avoid edge-to-edge abutment of the front and rear grapping jaws as the bucket is moved to closed position. The cutting bit or bits 95 extending transversely of the lower edge of the rear bucket section are removable so that they can be readily replaced or reversed when wear occurs.

Referring now to the construction of the front bucket section Bf, the principle structural elements thereof comprised two vertical side walls 185, which are joined together across their bottoms by transverse bottom wall 186, all being composed of heavy plate stock. This front bucket section has a completely open front and a completely open back between the vertical side walls 185. Each side wall 185 may be formed with a straight line outer edge and a straight line bottom edge, but the inner or rear gripping edge thereof is preferably formed with a long sweeping curve for mounting the curved inner grappling jaw carried by the front bucket section.

Extending cross-wise along the front or leading edge of the bottom bucket wall 186 is a heavy cutting bit 190, and extending along the rear edge of this bottom bucket wall is another heavy cutting bit 195. The front cutting bit 190 breaks up earth and rocks and picks up such material in a forward motion of the front bucket section when this cutting bit is inclined at a proper cutting angle; and similarly, the rear cutting bit 195 breaks up soil and rocks and picks up such material in a rearward motion of the front bucket section when this rear cutting bit is inclined at a proper cutting angle.

Referring briefly to one of the typical earth moving functions of the bucket, particularly as illustrated in FIGS. 2, 3 and 4, it will be seen that the relative movement between the front and rear bucket sections is comparable to that of a parallel link or quadrangular link system, particularly as the bucket sections approach the bucket closing position. For example, starting with the bucket wide open and fully extended in a forward direction as shown in FIG. 2, preparatory to beginning a back-hoeing, dirt smoothing or like operation, the initial downward movement of the front bucket section Bf has a slight arcuate component of motion in moving from approximately the position shown in FIG. 2 to approximately the position shown in FIG. 3, this arcuate component being represented by the dotted arc a—a. However, it should be pointed out that it is not during this initial range of downward movement of the front bucket section that the substantially straight rectilinear line of sweep of the rear cutting bit 195 is desired, but only after the front bucket section has moved into approximately the position shown in FIG. 3, following which the operator can utilize this rectilinear straight line direction of sweep of the bit 195 to produce a finished horizontal surface in the top surface of the soil. This substantially straight rectilinear line of cutting or scraping is represented by the line b—b in FIG. 3, which straight line travel b—b constitutes approximately two-thirds to three-fourths of the total distance of travel. FIG. 4 shows he completion of the closing movement of the front bucket section Bf along this rectilinear line of travel b—b.

FIGURE 5 illustrates a bucket position somewhat similar to those shown in FIGS. 2 and 3, but on a substantially larger scale, so as to shown the bucket performing one of its improved grappling functions to better advantage. Let it first be assumed that the front bucket section Bf has been dropped down over a collection of logs, railroad ties, pipes or other objects, with this front bucket section Bf extended outwardly into approximately the position shown in FIG. 2. By now moving the front bucket section rearwardly with its characteristic rearward sweeping motion as shown in FIG. 5, these different objects can be rolled together or piled up in a concentrated collection for subsequent gripping between the front and rear grappling jaws. The long arcuate curvature of the front grappling jaws 110 and the upward and inward slope of the jaw teeth 110a along this arcuate curvature, greatly increase the ability of the front bucket section to grasp objects on their outer or far sides and to draw them rearwardly toward the back bucket section.

The improved grappling action of the bucket also enables it to embrace and securely hold a large tree trunk or tree stump extending crosswise of the bucket. It will be noted that the long arcuate curvature of the front grappling jaws 110, the upward slope of the teeth 110a therein, and the approach by the front and rear grappling jaws into their rectilinear zone of grappling engagement, afford very effective engagement over large tree trunks, etc. The improved grappling action can also be effectively performed on an object of substantially smaller diameter, where the front and rear grappling jaws can move closer together in a substantially smaller bite. The substantially parallel, rectilinear motion between the front and rear grappling jaws is particularly significant in the case of small bites, where it enables extremely large gripping pressures to be set up between the jaws; and where it also enable a plurality of objects of approximately the same diameter to be gripped in a stacked series between such parallel gripping jaws. This latter portion of the closing motion, where the relative movement is in substantially parallel planes, gives a very powerful vise-like gripping action between the jaws.

FIGURE 5, in addition to showing the effective grappling action between the two bucket sections, also shows the arcs of swing of the two mounting links 100 and 200. The front link 100 has its fulcrum pivot W located in close proximity to the bottom of the rear bucket section Br; the rear line 200 has its fulcrum pivot Y located approximately half-way down the vertical height of the rear bucket section; the straight line distance between these two lower fulcrums W and Y being approximately twice the straight line distance between the two upper swinging pivots X and Z on the front bucket section. Preferably, the front link 100 is substantially longer than the rear link 200, so the arc of swing A100 of the front link 100 has a considerably larger radius and is substantially flatter than the arc of swing A200 of the rear link 200, these two arcs intersecting substantially at the point A100–200 between the two limits of swinging movement of the front bucket section. The above proportioning of the lengths of the two mounting links 100 and 200, and location of the four pivot centers W, X, Y and Z, gives the desired wide opening and far-reach of the front bucket section Bf, and also gives the substantially straight line of sweep b—b (FIG. 3), and the substantially parallel closing motion between the grappling jaws 108 and 110. This figure graphically illustrates part of the translatory motion between the two bucket sections by showing three successive positions of the front bucket section Bf as it moves back toward the rear bucket section Br. The first position is shown in full lines, with the upper pivots of the links 100 and 200 in the positions X and Z. The second position is shown in dotted lines, with the upper pivots of the links 100 and 200 moved rearwardly along the arcs A100 and A200 into the positions X' and Z'. The third position is shown in dash-dot lines with the upper pivots moved rearwardly into the positions X'' and Z''. It will be noted that during these successive stages of movement, the rear cutting edge 195 of the front bucket section follows a substantially straight line of travel with respect to the ground. It will be understood, of course, that there may be substantial variations in the lengths of the links 100 and 200, and in the locations of the centers W, X, and Y, without departing from the invention.

In FIGURES 6–10, I have shown the basic construction of my improved bucket supplemented by the further provision of a lateral tilt, swivel joint 335 which is interposed between the bucket B and the front ends of the lifting arms 30 and tilting arms 78. The purpose of this lateral-tilt, swivel joint 335 is to permit the bucket to be tilted to right or left about what may be referred to as a trunnion or fifth-wheel axis x—x extending generally fore-and-aft substantially in prolongation of the front ends of the lifting and tilting arms 30, 78. This swivel joint greatly increases the field of utility of the device, such as, for example, by permitting the bucket to work substantially horizontally on its side, as for excavating horizontally under an overhanging ledge or the like; also, it permits the grappling jaws 108 and 110 to open and close with substantially horizontal movements therebetween for grasping either a vertically extending tree trunk, telephone pole, fence post, or the like, whereby to perform the operation of pulling the latter upwardly out of the ground, or to perform the operation of lowering the latter downwardly into a previously prepared hole in the ground. In this swivel joint construction, the bosses 87 which mount in the supporting arm pivot pins 80 and the bosses 88 which mount the tilting arm pivot pins 82 are welded to the four corners of a rectangular plate fixture 336, which constitutes the non-rotating portion of the swivel joint 335. It will be seen that this swivel plate fixture 336 responds to the raising and lowering motions and the tilting motions of the arms 30 and 78. The revolvable portion of the swivel joint consists of a relatively large diameter tubular boss or ring 337 which is welded to the back wall 94 of the rear bucket section Br, and which projects rearwardly therefrom through a circular swivel opening 338 in the swivel plate 336. The swivel boss 337 comprises a large diameter front portion 339 and a reduced diameter rear portion 340, the right angle shoulder 342 at the junction of these two portions having a rotative abutment fit against the front surface of the swivel plate 336. Formed in the reduced boss portion 340, on the back side of the swivel plate 336 is an annular locking groove 344 in which engage two locking or retaining segments 345 that overlap the rear face of the swivel plate 336 and retain it in the swivel seat 342. These segments 345 are formed with their inner arcuate surfaces curving upwardly out of the retaining groove 344 and terminating in upper pivot eyes 347 mounted on pivot pins 348 projecting rearwardly from the rear surface of the swivel plate 336. The lower ends of the locking segments 345 are adapted to be releasably locked together by an arrangement of pivoted links 349 and camming hasp 350, the release of which enables the segments to be swung outwardly and upwardly around their upper pivots 348 into releasing position, enabling the swivel boss 337 to be pulled forwardly through the swivel opening 338 in the swivel plate 336. It will be seen from the foregoing that the entire bucket assembly B consisting of the front and rear bucket sections is revolvable in the swivel joint 335 into laterally inclined or horizontal operating positions, substantially as illustrated in dotted lines in FIGURES 6 and 7.

Such swivelling movements are effected by power means preferably in the form of a hydraulic ram 352 comprising a cylinder 353 and a piston 354, the piston being pivotally connected to the swivel plate 336 by a pivot pin 355, and the cylinder being pivotally connected to the swivel boss 337 by forming a pivot clevis 357 along one side of the cylinder 353, and by forming a pivot tongue or lug 358 projecting radially inwardly at the rear end of the reduced swivel boss portion 340 for entry into the clevis 357. The pivot pin 356 passes through aligned pivot apertures in such clevis 357 and pivot tongue 358. It will be seen from FIGURE 7 that the line of thrust of the hydraulic ram 352 is so related to the arc of swing of the crank pin 356 connecting the cylinder 353 with the swivel boss 337 that the ram is capable of revolving this boss and the bucket through the 90° range ordinarily desired; and, in fact, the ram is capable of revolving the bucket through approximately 120° or more. The hydraulic ram is, of course, double-acting, and it can therefore be made to function as a locking device for locking the bucket in any desired angle of tilt. The two flexible hydraulic hose lines connecting with opposite ends of the ram cylinder are indicated at 361. In addition, two flexible hose lines 362 may extend outwardly through the large circular opening within the tubular swivel boss 337, the front ends of these lines which swivel with the bucket connecting through branch lines leading to the upper and lower ends of the two ram cylinders 104 which open and close the bucket sections; the flexibility of these hydraulic lines 362 passing through the tubular swivel boss 337 being frequently relied upon to accommodate all of the swivelling movements of the bucket. However, if desired, a two-way fluid conducting rotary union 364 may be mounted centrally of the axis of the swivel joint, as upon a spider 365 extending inwardly from the swivel boss 337, to accommodate the relative swivelling movement between the front rotating hose lines and the rear non-rotating hose lines. These two-way rotary fluid conducting unions 364 are well known.

In FIGURES 6–7, the bucket B is illustrated in its normal non-rotated position in full lines, and is illustrated in a swiveled or tilted position in dash-dot lines, these two positions being displaced approximately 90° from each other.

In FIGURE 10, I have shown the bucket as having been swiveled or revolved through approximately 90°, with its grappling jaws 108, 110 embracing the vertical trunk of a tree 370. As previously described, by reason of the multiple link mounting and the translatory closing movement of the front bucket section, these two grappling jaws can be made to engage the opposite sides of a tree trunk, telephone pole, fence post, or the like, under extremely high grappling pressures. In FIGURE 10, the root structure 371 of the tree is shown in vertical alignment with a hole 372 in the ground, this figure thereby serving to illustrate either the operation of forcibly uprooting the tree by pulling its root structure upwardly out of the ground, leaving the hole 372; or serving to illustrate the operation of resetting or planting the tree by lowering its root structure 371 down into a previously dug hole 372. Also, as previously referred to, with the bucket tilted to this approximately horizontal position shown in FIGURE 10, it can be made to dig soil out from under an overhang or to perform other soil moving operations in what woud generally be considered as inoperative or abnormal positions. The mounting of the bucket on the swivel joint 335 also permits either complete side dumping, or a gradual spilling of the bucket load, to one side or the other of the line of travel of the tractor. In performing excavating operations, stripping operations, etc., where it is difficult to swing or steer the tractor sidewise because of cramped quarters, the loaded bucket can be rotated laterally around the axis of the swivel joint 335 for dumping the load over the side edges of the bucket sections, either into a truck disposed to one side, or onto a laterally disposed dumping site. The swivel joint also permits a gradual spilling of the bucket load over the side edge during continued forward travel of the bucket. For example, by providing such swivel mounted bucket with front pusher rollers, the bucket can push a dump truck ahead of it for receiving a load therefrom, following which the bucket can be swiveled to spill or spread to the side at a graduated rate while it is still traveling forwardly, such procedure being advantageous when it is desired to spread a thin bed of black soil along the bottom of a trench preparatory to the laying of metallic pipe therein, the black soil bed minimizing corrosion of the metallic pipe. This side dumping or side spreading is hence a further advantage of the swivel joint mounting of the bucket.

In FIGURES 11–16, I have illustrated my improved bucket as being provided with a unique form of fork lift attachment 498, comprising a plurality of fork tines or arms 499 which project forwardly from the front material handling section Bx in laterally spaced relation. These fork tines 499 are adapted to be forced forwardly in under relatively long loads, or to have such loads placed thereon, for lifting, lowering, or transporting the same. These loads may be represented by logs, tree trunks, telephone poles, long slabs, boulders, or the like. For effecting the mounting of this fork lift attachment, it is preferable, but not essential, to employ a slightly modified form of front material handling section designated Bx, which front section has the same swinging mounting through the links 100, 200, either on the rear bucket section Br (FIGURE 1), or on the rear material handling section R disclosed in FIGURE 56 of my above mentioned copending application. Where the modified front section Bx is to be substituted for the standard front section Bf, this can be done quickly and easily by merely removing the swinging pivot pins X and Z and then inserting the swinging ends of the links 100, 200 and the pivots X and Z into the pivot pockets 207' of the modified bucket section Bx.

This modified front section Bx has the same arrangement of rear grappling teeth 110 extending down its rear side edges, and it may also have a lower rearwardly projecting earth cutting edge 95' extending transversely from side to side of the bucket. In the make-up of this modified front section Bx, it is provided with a heavy rectangular frame bar 501 which has its upper edge projecting slightly above the construction of the rear cutting edge 195', this frame bar being welded or otherwise secured to the side walls of the front section Bx and serving to carry the major portion of the forward thrusting forces and load lifting forces borne by the fork tines 499. Spaced above this load bar 501 and extending parallel therewith is a round anchoring bar or rod 503 which has its ends mounted for endwise sliding movement through cylindrical bushings 504 welded in the side walls of the front section Bx.

The front portion of each fork tine 499 is formed with a sled runner end 505. The rear end of each fork tine 499 is welded integrally to an upwardly extending standard 499a, thereby resulting in an L-shaped fork lifter arm 500. These L-shaped fork lifter arms 500 are slidable transversely along the lower rectangular bar 501 and along the upper round bar 503, whereby fork lifter arms can be readily added to or removed from the attachment mounting on the front section Bx, and whereby the fork lifter arms can be shifted to different positions across the front edge of this front section. The back surface of the angle-shaped juncture between each fork tine 499 and its vertical standard 499a bears at 508 against the front surface of the rectangular frame bar 501, as shown in FIGURE 13. Welded to the opposite sides of this juncture are flat retaining clips 509 provided with downwardly extending hooks 510 which are adapted to be dropped down over the top edge of the rectangular frame bar 501 in the mounting of the lifter arm assemblies 500, and which are adapted to be slid along the frame bar 501 in the lateral shifting or spacing adjustment of the lifter arm assemblies, but which hooks 510 prevent outward swinging movement of these fork lifter assemblies away from the lower frame bar 501 when the bucket or front section Bx is tipped forwardly in a downward direction.

Welded to the upper end of each vertical arm or standard 499a is an apertured mounting boss 512 which has slidable mounting on the upper round bar 503. The back side of each mounting boss 512 is provided with a threaded bore 514 into which screws a manually actuatable clamping screw 517. This screw pushes ahead of it through the threaded bore 514 a wedging plug 518, which is formed at its forward end with a recessed rounded wedging surface 519 that is adaptable to bear with a wedging grip against the lower cylindrical surface of the round bar 503. The outer end of the clamping screw has a crank arm or handle 521 to facilitate the manual rotation of the screw; and a lock nut 522 may thread over the outer portion of the clamping screw for effecting locked engagement against the back side of the guide boss 512. Thus, each L-shaped fork lifter arm 500 can be clamped at any desired point across the front edge of the front load handling section Bx. The round bar 503 can be slid endwise out of the end mounting bushings 504 for accommodating the ready addition or removal of the fork arms. Each outer end of the round bar 503 is releasably held against inward shifting movement by a washer 524 bearing against the outer end of the mounting bushing 504 or outer face of the bucket side wall 185' by a bolt or cap screw 525 screwing into the end of the round bar. At one or more intermediate points in the span of the upper anchoring rod 503 there may be provided an upright support arm or strut 526 welded at its lower end to the base bar 501 and cutting edge assembly 195', and having a guide hub 527 at its upper end through which the anchoring rod 503 has slidable mounting. If desired, a vertical load retaining plate 528 can be extended upwardly from the inner or front portion of the rear cutting edge 195', reaching horizontally between the side walls 185' or from each side wall to the fixed upright 526, for holding soil cut by the cutting edge 195'.

The ability to raise and lower the load handling assembly Bx–Br through the support arms 30, and the ability to project or retract the front section Bx by tilting of the entire assembly through movement of the tilting links 78, enables the fork lift fingers 500 to have a wide range of adjustable movement for picking up a load, transporting a load, or discharging or dumping a load. FIGURE 11 illustrates how the fork lift fingers or arms 500 can be moved downwardly into a hole or low level position disposed considerably below ground level, such ground level being indicated approximately by the horizontal line G—G therein. The manner of getting the bucket sections down into such a low level position has been previously illustrated and described in my co-pending application. The unique ability to get a fork lift down into a position much below the supporting surface in which the vehicle rests has numerous obvious advantages. From this low level position, the fork lift can be raised into an upper position disposed a considerable distance above ground level. In each of these extreme positions, and in all intermediate positions, the fork arms can be maintained at a horizontally extending angle, or at any upwardly tilted angle which may be more suitable for carrying the load, by controlling the relative positions of the lifting arms 30, tilting arms 78, and the degree of angular opening between the front and rear sections Bx, Br. Similarly, the fork arms can be projected forwardly or retracted rearwardly at any of these different vertically adjusted positions by swinging the front load section Bx toward or away from the rear section Br; and if it is desired to hold the fork arms horizontal or at any other chosen angle in such projected or retracted positions, this can be done by tilting the load handling assembly around the rocker pivots 80 to maintain such desired angle. The dumping from the fork arms can be effected by lowering the support arms 30, by rocking the entire load handling assembly Bx, Br through the tilting links 78, or by rearward closing movement of the front section Bx toward the back section Br.

The mounting of the fork lifter arms 500 on the above-described material handling assembly Br, Bx enables the fork lifter arms to be given all three of the maneuvering movements which can be imparted to the front material handling section of the assembly. That is to say, the fork arms can be given: (1) raising and lowering movements imparted through the lifting and lowering arms 30 from the first hydraulic power means 42; (2) fore-and-aft tilting movement imparted through the tilting links 78 from the second hydraulic power means 52; and (3) extending and retracting movements, with or without tilting, imparted through relative opening and closing movements between the front and rear sections Bx, Br effected by the third hydraulic power means 104. Thus, as shown in FIGURE 11, the fork arms 500 can be lowered five or six feet down to a lower floor or deck level, with the fork arms extending horizontally or tipped upwardly or downwardly, such downward tipping being illustrated in dotted lines in the lower portion of FIGURE 11. From any such lower positions, the fork arms 500 can then be raised upwardly from twelve to fifteen feet above ground level, with the fork arms still extending horizontally or tipped upwardly or downwardly. In any of these lower or upper or intermediate positions, the fork arms can be projected forwardly or retracted rearwardly, indicated by the successive inner and outer dotted line positions shown in FIGURE 11, such as by causing the substantially translational relative opening and closing movements between the front and rear load handling sections Bx, Br, and/or with tilting of this load handling assembly. In FIGURE 12 I have shown the attachment 498 as being provided with only two fork arms 500, but if desired a substantially larger number of fork arms may be arranged closer together, particularly when the attachment is to function analagously to a grubber or rock fork for grubbing out roots, stumps or embedded rocks, etc.

Attention is also directed to the fact that this modified assembly Bx, Br, in addition to providing the above described fork lift feature, still retains the aforementioned grappling capability between the rear and front grappling jaws 108 and 110, and also retains the aforementioned bull-dozing and earth moving capability performed by the rear bull-dozing wall 94 and cutting blade 95, when the front selection Bx has been swung up to a clearing position. The retention of the rear cutting edge 195' across the back of the front load handling section Bx is also of benefit in certain earth moving operations, as when the front section Bx has been swung down into a lower position, or is caused to swing downwardly for cutting soil.

In FIGURE 16 I have shown this same fork lift attachment 498 as being carried on a swivel joint mounted material handling section, substantially as disclosed in FIGURES 6–10. That is to say the rear material handling section Br has connection through a swivel joint 335 with the lifting arms 30 and tilting arms 78, whereby the material handling assembly and fork lift attachment 498 can be swiveled or tilted to right or left around a swivel or fifth-wheel axis X—X. This swivel joint 335 comprises the same swivel plate 336 and related parts, as previously described in connection with FIGURES 6 to 10 inclusive. The provision of the swivel joint 335 enables the right and left ends of the fork lift attachment 498 to be tipped upwardly or downwardly as desired; as, for example, to enable the group of fork tines 499 to be pushed in the under a nonhorizontal or sloping load surface, or to enable the extreme right hand fork tine or the extreme left hand fork tine to be tipped into a laterally cocked position for manipulating in cramped quarters, or for getting in under a limited root area, boulder area, etc. The fork lift attachment, so mounted on the swivel joint 335, has the entire range of lifting, lowering, fore and after tilting, and swinging adjustments above described, and in addition has the full range of lateral swiveling or tilting adjustment that is provided by the swivel joint.

In FIGURES 17 to 25 I have shown a further modification which comprises three material handling sections Fx, Rx, and Gx representing, respectively, the front material handling section, the real material handling section, and an intermediate material handling section or swinging closure gate. The front material handling section Fx is comparable in general outline to the front bucket section of the previously described embodiments, this front section having the same general relation of an open front and open rear provided respectively with a front cutting edge 190x and a rear cutting edge 195x; and also being formed with the same general shape of curved rear grapling edges provided with rearwardly projecting grappling teeth 110x.

The rear material handling section Rx is preferably formed as a rear grappling section, as distinguished from the rear bucket section Br of FIGURES 1–16, and this rear material handling or grappling section Rx has the previously described pivotal mounting at 80 on the pair of lifting and lowering arms 30, and has the previously described pivotal connection at 82 with the same general type of tilting or automatically self-leveling linkage 78 previously described.

The intermediate or swinging gate type of material handling section Gx is adapted for swinging movement within the front bucket section Fx, on transversely aligned pivot pins 218x carried in the side walls of the front bucket section. In this embodiment shown in FIGURES 17, etc. the swinging gate section can be separated from the front bucket section by pulling out the two opposite pivot pins 218x from aligned pin sockets 218b in the bucket section Fx and pin sockets 218c in the side walls of the swinging gate section. This gate section is adapted to be swung around the pivot pin axis 218x through an arrangement of double-acting hydraulic rams 475x connecting through piston rods 480x and reach rods 482x which have pivotal connection with pivot pins 484x mounted on the side walls of the swinging gate. This gate section Gx preferably has a range of angular swinging motion of about 110 to 120 degrees. Formed along what are generally the front edges of the closure gate are right and left sets of grappling teeth 458x which are adapted to cooperate with the curved grappling teeth 110x formed along the rear edges of the front bucket section, as for grappling logs, tree trunks, pipe sections, or the like (see FIGURE 17). The closure gate is formed with a curved back wall 216x, terminating at the rear edge in the cutting bit 490x and terminating at the other edge in an upper or front cutting bit 488x having a notch 489x on its back side adapted to abut against the front cutting bit 190x of the bucket section when the parts are positioned to perform the type of bull-dozing or grading operation shown in FIGURE 20.

The opposite or rear side of the intermediate gate section Gx has transversely spaced concave grappling surfaces 457x which are adapted to cooperate with concave curved grappling surfaces 108x formed in the forward side or face of the rear material handling section Rx. These two facing concave grappling surfaces are adapted to be swung together for effecting grappling engagement over large circular objects or collections of objects, such as is illustrated in FIGURE 23. These opposed concave grappling surfaces 108x and 457x preferably have relatively smooth grappling surfaces which are devoid of grappling teeth, so that these smooth grappling surfaces can be utilized for picking up culvert shells, thin wall pipe and the like, without risk of crushing or injuring the thin walls or the other surfaces of such objects.

Formed in the back portion of the swinging gate Gx substantially at the ends of the concave grappling surfaces 475x are transversely extending sockets or holes 431b and 432b; and formed in the front portion of the back section Rx is a cooperating pair of like sockets or holes 431c and 432c. When these two sets of holes or sockets are both moved into transverse alignment, upper and lower pairs of locking or pivoting pins 431x and 432x are inserted through these pairs of aligned holes, such pins having enlarged outer heads or being otherwise formed to facilitate the easy insertion and removal of such pins from the above transversely aligned sockets. When both the upper and lower pins 431x and 432x are inserted through the aligned pairs of holes at opposite sides of the load handling assembly, the intermediate swinging gate Gx is thereupon locked up to the rear load handling section Rx, this relationship being shown in FIGURE 17. If, at the same time, the two locking pins 281x are inserted in the front pairs of apertures 218b and 218c, the front bucket section Fx will be locked to the intermediate gate section Gx, with the result that all three sections Fx, Gx and Rx will be locked together so that the entire material handling assembly will move as a unit in response to lifting and lowering movements transmitted through arms 30, or in response to tilting movements transmitted through tilting links 78, as for skid shovel digging. The three pairs of pivot pins 218x, 431x and 432x are all of the same size so that they can be inserted interchangeably in the three sets of holes 281b-281c, 431b–431c and 432b–432c.

In this last described embodiment of the invention, the front material handling section Fx and the rear material handling section Rx may be connected together through the previously described system of swinging links pivotally connected with the front and rear sections by way of the pins corresponding to W, X, Y and Z, as shown in FIGURES 1–5, etc. However, as illustrating a further modification of the invention which may be employed if certain operating characteristics of the link mounting are not deemed necessary, I have shown the front load handling section Fx connected to the rear load handling section Rx on a single pivot axis P—P defined by transversely aligned pivot pins Px passing through pivot holes in the upper arm portions 198x of the front section Fx, and also passing through aligned pivot holes in the forwardly projecting arms 423x of the rear load handling section Rx. The front section Fx is adapted to be swung forwardly and rearwardly around this single pivot axis P—P through the operation of two double-acting hydraulic rams 104x which are mounted in laterally spaced relation across the back side of the rear section Rx, as shown in FIGURE 18.

Each of these hydraulic rams 104x is mounted vertically between right and left pairs of vertically extending parallel frame plates 418x-419x which lie in close proximity to the sides of the cylinders and which define frame elements of the rear grappling section Rx. Surrounding and secured to the lower portion of each of the two ram cylinders is a fixed collar 148x which mounts pivot pins 147x extending through the parallel frame plates 418x–419x, thereby establishing a horizontal pivot axis around which each ram cylinder can swing forwardly and rearwardly relatively to the frame plates 418x–419x. Rigidly joining the lower portions of each of the inner frame plates 418x of the right and left hand pairs is a lower transverse frame tube 410x having its ends welded to these inner plates. Similarly, the upper portions of these two inner frame plates 418x are correspondingly joined together by an upper transverse frame tube 417x which also has its ends welded to these inner frame plates 418x. Mounted at the bottom portions of the rear material handling section Rx may be U-shaped skid shoes 423x comprising transverse ground bearing flat plates 423a having upwardly deflected front and rear ends 423b which, in the performance of certain earth moving operations, may be provided for sliding on the ground to afford reaction points, etc., when such are desired. As best shown in FIGURE 25, these skid shoe plates 423x are preferably welded across or between the lower extended ends of each pair of vertical frame plates 418x–419x, whereby each skid shoe plate 423a ties together and reinforces each pair of these inner and outer frame plates 418x–419x. The shoe plate may also be bolted to the lower ends of the frame plates 418x–419x for permitting angular or other adjustments of the shoe plate. The two side edges of each skid plate extend outwardly substantially beyond the frame plates 418x–419x to provide a substantial area of ground engaging surface, and formed centrally of each skid plate is a fore-and-aft slot 423d which accommodates the relative swinging movement of the adjacent lifting and lowering arm 30.

Formed in the forward edges of each pair of the rear section frame plates 418x–419x are the smooth concave grappling surfaces 108x which cooperate with the rearwardly facing concave grappling surfaces 457x formed in the rear side of the gate section Gx. Also extending through these frame plates 418x–419x of the rear section are upper and lower sets of transverse holes 431c and 432c for receiving the removable locking-pivoting pins 431x–432x.

Extending upwardly on the outer sides of the frame plates 418x–419x, in embracing relation thereto, are pairs of outer plates 459x–460x which project rearwardly from the back wall 216x of the intermediate gate section Gx. Formed in the back edges of the plates 459x–460x are the concave curved grappling surfaces 457x (FIGURE 23); and also extending transversely through these plates or flanges are the upper and lower pairs of pivot pin holes 431b and 432b for receiving the pivot-coupling pins 431x–432x. The pairs of inwardly disposed vertical plates 418x–419x extend upwardly to mount the single axis pivot pins Px that pivotally connect the front and rear sections together. The piston rods 144x which extend out of the ram cylinders 104x have pivot eyes at their upper ends, which have pivotal connection through pins 140x between pairs of extension arms 420x extending upwardly and rearwardly from the top of the front bucket section Fx. It will thus be seen that extension and retraction of the double acting ram units 104x serves to swing the front bucket section Fx toward and away from the rear material handling section Rx.

Referring now to the mounting of the double acting hydraulic rams 475x which swing the intermediate gate section Gx, the cylinders of these rams are mounted on transverse pivot pins 477x. The pivot pins 477x are mounted in pivot holes in the outer side wall 198x of the front bucket section and in the inner wall 490x formed at the end of a trough shaped upper portion of the front section Fx, the axis of these pivot pins 477x being preferably coincident with the axis P—P which pivotally connects the front section with the rear section.

Referring now to some of the different operations which can be performed by this last described embodiment, FIGURE 19 illustrates trenching or deep digging operations wherein the front bucket section Fx can be employed substantially independently of the rear grappling section Rx. Thus, to scoop or back-hoe earth rearwardly and upwardly from the rear slope 231x of an excavation Ex, the front bucket section Fx is released entirely from the rear grappling section Rx by the removal of the upper and lower pivoting pins 431x–432x, permitting the rear grappling section Rx to be swung upwardly and rearwardly into the non-operating position shown in FIGURE 19. At the same time the intermediate gate section Gx is swung hydraulically around pivot pin axis 218x into a forward position to close off the front opening of the front bucket section Fx. Thereupon, the bucket assembly is moved rearwardly and upwardly to cause the back cutting edge 195x of the front bucket section Fx to cut soil from the rear bank 231x, filling the front bucket section with soil up against the closure gate Gx. According to one overhead dumping operation, typically represented in FIGURE 21, this loaded front bucket section Fx can then be elevated to a position of maximum lift, or maximum reach, or both, through the lifting arms 30 and tilting arms 78, with the entire load of soil being held against spillage from the front side of the front bucket section by the closed position of the gate section Gx closing this open front, and the bucket section tipped clockwise sufficiently far to prevent the soil dumping over the rear cutting edge 195x. In this one typical dumping operation, when the bucket is at dumping height and reach, the bucket section is revolved in a counterclockwise direction around pivot axis P—P for dumping the soil out over the back cutting edge 195x and at this time the gate section Gx may, if desired, be swung counterclockwise in order to deflect or pinch off the rate of discharge for directing it into a dump truck or into a predetermined stock pile area. Conversely, when it is desired to scoop earth from the forward slope 230x of this excavation, the gate section Gx is swung hydraulically in a counterclockwise direction to close the open rear side of the bucket section and to open the front side. Thereupon, the front cutting edge 190x is moved forwardly and upwardly to cut soil from the forward bank 230x for filling the front bucket section with soil, up against the rearwardly positioned closure gate Gx. In dumping from such a forward cutting position, the front bucket section can be tipped substantially into the position shown in FIGURE 21, and the rearwardly positioned gate can then be swung clockwise to permit the rearward dumping of the load out over the back cutting edge 195x, as shown in FIGURE 21. By virtue of the ability to raise the load with the front bucket section tipped either forwardly or rearwardly, coupled with the ability to dump from either the front edge or the rear edge of the front bucket section, it is possible to obtain a larger degree of vertical height or a larger degree of horizontal reach to more accurately dump into a truck or stock pile in the dumping operation.

In FIGURE 20 I have illustrated the parts in one preferred relation for performing bull-dozing or forward scraping operations. For such operations, the two rear cupling pins 431x–432x are removed from each side of the assembly for freeing the intermediate gate section Gx from the rear section Rx, whereupon this gate section is then swung clockwise around the pivot pin axis 218x to close off the front side of the bucket section Fx, substantially as shown in FIGURE 19, but differing therefrom in that the front bucket section Fx is tipped forwardly so as to bring its front cutting edge 190x down into bull-dozing or scraping position. In this operating relation, the front bucket section Fx and gate section Gx are moved forwardly together under tractor power to have the front cutting edge 190x together with the gate cutting edge 488x and the curved front face 492x of the gate section all operating together as a bull-dozing blade. Different depths and degrees of cut may be obtained by extending or retracting the hydraulic ram cylinders 104x, or by raising or lowering the arms 30, so as to adjust the angle or the height of the compound cutting edge 190x, 488x.

FIGURE 21 shows one of the overhead dumping possibilities, which have been previously described.

In FIGURE 22 I have shown another position of the parts for causing the rear bit or cutting edge 490x of the gate section Gx to perform a forwardly moving grading or scraping operation for grading or scraping soil up into the intermediate gate section Gx. To establish this operating relation, the upper pair of coupling pivot pins 431x are removed from the sides of the assembly, and, correspondingly the intermediate coupling pivot pins 218x are likewise removed from the opposite sides of the assembly. However, the lower pair of coupling pivot pins 432x are allowed to remain in place, so that approximately the full tractor power can be transmitted by way of the pusher arms 30 substantially directly through the pivots 80x and 432x to the cutting blade 490x at the bottom edge of the gate section Gx, without having to transmit any large proportion of the tractor power through either of the hydraulic rams 104x or 475x. In starting the operation the shoe 423x is placed at ground level and the blade 490x is given an initial setting to cut slightly below the ground level. Thereafter, with the shoe riding on the bottom of the cut, the blade is tipped downwardly or upwardly around the shoe 423x to get a deeper or shallower cut. In this relaitonship of the parts, the front bucket section Fx is in an upwardly inclined position with its front cutting edge 190x tipped up entirely out of cutting position, but in which position this front bucket section Fx functions substantially as a dirt-holding forward extension of the gate section Gx, so that these two sections together can hold a large quantity of the soil as it is being cut by the cutting blade 490x and as it "boils" upwardly within the two sections Gx and Fx. The operating relation in this set-up also enables the intermediate gate section Gx and its soil cutting blade 490x to be quickly and easily rocked to and fro into different cutting angles and to result in good depth control for fine grading. For example, the energization of the two secondary rams 475x in this operation either upwardly or downwardly will tilt the gate section Gx and its cutting bit 490x either upwardly or downwardly around the pivot axis 432x (which in turn has ground support on shoe 423x) in a close accurate depth control for fine grading. Moreover, the energization of the primary rams 104x either upwardly or downwardly in this operation shown in FIGURE 22 will swing the front bucket section Fx toward and away from the cutting position of the bit 490x and the gate section Gx. Still further, the energization of the tilting cylinders 52 and tilting links 78 will also tilt the cutting bit 490x and shoe 423x. To retain the soil in these two sections Gx and Fx as they move out of the cutting position and upwardly toward dumping position, the front bucket section Fx can be tilted down or the gate section Gx can be tilted up, or both, so as to enable the bottom wall 186x of the front section Fx to be moved in under the gate section Gx to temporarily close off the open end or bottom 497x of the gate section Gx, which extends from the bit 490x forwardly out to the toothed edge 458x. Bull-dozing can also be performed in this general operating relation shown in FIGURE 22 by swinging the front bucket section Fx upwardly (see FIGURE 24) and then relying upon the collected mass of soil within the gate section Gx, and between the side walls thereof, to function as a bull-dozing blade or surface.

FIGURE 23 illustrates the previously described grappling relation wherein the smooth concave grappling surfaces 108x formed in the forward face of the rear material handling section Rx cooperate with the smooth concave grappling surface 457x formed in the rearward face of the intermediate gate section Gx, particularly in situations wherein it is desired to utilize smooth grappling jaws for picking up thin wall pipe, culvert sheels, concrete forms and the like, which might otherwise be crushed or injured by the use of toothed grappling jaws, such as the toothed jaws 110x and 458x shown in dotted lines in FIGURE 17 in the grappling relation of picking up and carrying the log L. This grappling capability shown in FIGURE 23 is obtained by merely removing the upper and lower sets of coupling pins 431x and 432x. The inwardly curved lower points of the two smooth concave grappling jaws 108x and 457x reach in under any single object or collection of objects and prevent the latter from dropping down, even if not held under heavy sidewise pressure.

In FIGURE 23 I have also shown this three-element embodiment as being provided with a swivel joint 335x identical with or equivalent to the swivel joint 335 disclosed in FIGURES 6–10, or disclosed in FIGURE 16. Such swivel joint 335x is of practically the same construction as the previously described swivel joint 335, whereby it permits the grappling jaws 180x and 457x to open and close either in a horizontal plane or in a vertical plane; viz, it permits the grappling jaws 108x, 457x to grasp a vertically extending tree trunk, telephone pole, fence post or the like for lifting or lowering it out of or into a hole in the ground, or to swivel such an object into either a horizontal angle or into a vertical angle, or into an intermediate angle therebetween. This swivel joint 335x is also advantageous for enabling loads of loose material to be dumped sidewise from either end of the bucket section Fx or the gate section Gx; and it may be further used advantageously with the fork lift attachment shown in FIGURE 24, now to be described.

This fork lift attachment 498x shown in FIGURE 24 is intended to be substituted for the intermediate gate section Gx. Such lift attachment is provided with upwardly extending standards or a back provided with forwardly extending fork times or arms 499x laterally spaced across the front of the unit, comparable to the fork lift construction disclosed in FIGURES 11, 12, 16, etc. Projecting rearwardly from the back side of the upwardly extending standards or frame are the apertured bosses or sockets 431b and 432b which are adapted to be locked in alignment with the companion sockets 431c and 432c on the rear section Rx by way of the removable coupling pins 431x, 432x. This fork lift attachment can thus be raised and lowered or tilted fore and aft by the relative vertical movements of the lifting arms 30 and tilting arms 78. The front bucket section Fx can be left in its pivoted mounting at P on the rear section Rx for vertical swinging movement around such axis P under the action of the two-way rams 104x, for permitting such front section to function as a downwardly swinging grappling element for holding logs, posts and the like pressed down against the fork arms 499x. As above described, the swivel mounting 335x also cooperates advantageously with this fork lift attachment for enabling the fork tines to be moved in under inclined loads, etc.

In FIGURES 26–28 I have illustrated a modified form of fork lift apparatus which is particularly adapted for quick and easy mounting directly on the front bucket section Bf of the embodiment shown in FIGURES 1–5, or on the front bucket section Fx of the embodiment shown in FIGURES 17–25. This modified fork lift arrangement comprises a plurality of two or more separate fork lift attachments, each designated 600, which are adapted for clamping engagement at laterally spaced locations across the transverse bottom wall 186 of the front bucket section. Each such fork attachment 600 comprises a forwardly extending fork tine 601 and an upwardly extending fork standard or post 602, which are welded together at 603. Rearwardly of the fork standard 602, the tine bar 601 is bent diagonally upwardly at 604, and welded between the upper end thereof and the upper portion of the fork standard 602 is a bar or plate 606, the latter being welded to the tine bar at 607 and to the standard 602 at 608. Welded or otherwise secured within the triangular area defined between the tine standard 602, the inclined tine extension 604 and the diagonal upper bar 606, is a solid gussett plate 610 which reinforces the entire structure against loads lifted upwardly on the front tine bars 601.

Welded to the back side of the upright standard 602 directly above the upper extremity of the diagonal bar 606 is a transverse block 612 which has its ends extending slightly beyond the sides of the upright standard. Defined between the under surface of this block 612, and the upper rear surface of the diagonal bar 606, is a transverse clamping notch or pocket 614 which is adapted to fit down over the front cutting edge or bit 190 of the front bucket section Bf. Two spaced pivot lugs or eyes 616 are secured to the upper side of the block 612 and rear side of the upright standard 602, for receiving a transverse pivot pin 618 of the clamping or tensioning mechanism to be later described.

Referring now to the lower portion of the unit, there is welded or otherwise secured to the upper rear side of the diagonal bar portion 604 a hinge bracket 622, provided with spaced upper and lower pivot holes 623 and 624 respectively adapted to receive alternatively the transverse pivot pin 625. Pivotally mounted on this pin 625 is a clamping lever structure 628, which preferably comprises duplicate spaced plates 628' having lower apertured ends pivotally mounted on the transverse pivot pin 625 on opposite sides of the bracket structure 622. The swinging upper ends of these two clamping lever side plates have downwardly facing pivot notches 630 formed in their rear edges for engaging over aligned pivot studs 632 projecting from opposite sides of an apertured pivot block 635 disposed between the lever plates. This pivot block 635 constitutes part of a tensioning device 640 which is adapted to be swung in over the top surface of the bucket bottom wall 186 in the operation of mounting each fork lift attachment 600. Formed in the front or upper edges of the lever plates are clamping notches 637 which are adapted to engage over the rear cutting edge or bit 195 of the front bucket section. This clamping notch 637 is adapted to be drawn up hard against the rear cutting bit 195 of the bucket through the operation of the tensioning device 640 which is operative to exert a heavy tension pull from the upper anchor pin 618 down to the lower pivot studs 632 seating in the sockets 630 of the clamping lever 628. This tensioning device comprises a pair of spaced bars or straps 642 which have their upper ends pivoted on the anchor pin 618 between the spaced pivot lugs 616, and which extend downwardly therefrom in laterally spaced relation to a transverse plate or cross bar connection 644 which joins the lower ends of such bars 642. Extending upwardly through the apertured pivot block 635 and through an aperture in this cross connection 644 is a rod 646 having a threaded upper end. A nut-shaped head 649 on the lower end of such threaded rod enables it to be turned from its lower end. Engaging over the threaded upper end of the rod, above and below the cross connection 644, are upper and lower nuts 651 and 652. The upper nut 651 may be held against rotation between the side straps 642. The release or backing away of the lower nut 652, and the rotation of the threaded rod through end head 649, enables the effective length of the tensioning drive device 640 to be adjusted for pulling the clamping notches 614 and 637 up hard against the front cutting bit 190 and the rear cutting bit 195 of the bottom wall 186 of the front bucket section. This forces the top surfaces of the bar 606, of the end of bar 604, and of the hinge bracket 622, up hard against the bottom surface of the bucket wall 186 for securely locking the fork lift unit 600 to the front bucket section in the relation illustrated. In the mounting of each fork lift unit 600 at any desired point across the width of the bucket section, the threaded rod 646 is adjusted downwardly to enable the pivot studs 632 to clear the lever 628 and pivot notches 630. This permits the entire tensioning assembly 640 to be swung in an inward and downward direction through the open front of the bucket section, into the position where the pivot studs 632 can then be thrust upwardly into the pivot notches 630 for establishing a tight clamping engagement of the clamping notches 614 and 637 over the front and rear cutting bits 190 and 195. A conventional load on the fork tines is indicated in dotted lines at L, and by virtue of the ability to control the angle of the front bucket section in all of its raising and lowering movements, the fork tines and load can be lifted straight upwardly in a fixed horizontal plane, as indicated in the upper dotted line position of the load in FIGURE 26.

FIGURE 28 illustrates the same construction of fork lift unit 600 mounted on the front bucket section Fx of FIGURES 17-25. On the assumption that this front bucket section Fx has a narrower fore-and-aft width of bottom wall 186x between the front and rear cutting bits 190x and 195x, I have shown the clamping lever pivot pin 625 as having been moved from the lower pivot hole 624 in bracket 622 up into the upper pivot hole 623. This serves to shorten the space between the clamping notches 614 and 637 to accommodate the narrower width of bottom wall 186x.

Obviously, this third form of fork lift apparatus 600, utilizing two or more entirely separate or independent fork tines 601, may also receive the swiveling rotation of the swiveling mechanism 335 or 335x when associated with either the two-section embodiment or the three-section embodiment of the load handling apparatus. This third form of fork lift apparatus 600, by virtue of its ready mounting and dismounting ability, can be temporarily disconnected by merely driving the fork tines 601 into a mound of soft earth, haystack, or other pile of readily penetrable material, thereupon releasing the clamping notches 614 and 637 from the edges of the front bucket section bottom wall, and then backing the load handling apparatus away. In remounting the fork tines, the front bucket section is merely maneuvered back into position to enable the clamping notches to be re-engaged over the front and rear edges of the bucket bottom wall.

It will be seen from the foregoing that the three forms of the fork lift apparatus herein disclosed, greatly increase the range of utility of the different embodiments of the load or material handling apparatus with which they are shown as being associated. That is to say, each embodiment of load handling apparatus can thereupon function: (1) as an earth moving device; (2) as a grappling device for picking up logs, tree trunks, etc. crosswise or otherwise; and (3) as a fork lift device wherein loads are laid upon the fork tines, or wherein the fork tines are forced in under the loads, which loads are thereupon raised, lowered or transported. When the apparatus is functioning in the capacity of any one of these three devices, such device has the benefit of the entire range of lifting and lowering movements, fore-and-aft thrusting or shifting movements, and angular tilting movements, which can be brought into operation through the lifting arms 30, the tilting links 78, and the ram cylinders (140, 140x and 475x) which affect relative movement between the load handling sections. Also, when the apparatus is functioning in the capacity of anyone of these three devices, such device can also have the benefit of the swiveling rotation about the axis of the swiveling mechanism (335, 335x).

While I have illustrated and described what I regard to be the preferred embodiments of the invention, nevertheless it will be understood that such are merely exemplary, and that numerous modifications and rearrangements may be made therein without departing from the essence of the invention.

I claim:

1. In load handling apparatus for mounting on a vehicle of the class described, the combination of a rear grapling section, a front bucket section, means connecting said sections together for relative opening and closing movements therebetween, a hydraulic power means for effecting such opening and closing movements, a swinging gate section carried by said front bucket section, a plurality of soil cutting blades carried by said sections, first and second vertically spaced sets of socket holes in said rear section and in said gate section operable to be placed in alignment, releasable coupling pivot pins receivable in said aligned sets of socket holes in said rear section and in said gate section for releasably coupling said gate section to said rear section, the construction being such that the release or withdrawal of both of said pins from both sets of socket holes permits complete uncoupling between said sections, and the release of only one of said pins permits relative pivotal movement between said sections around the pivot axis of the other pin, a third set of socket holes in said front section and in said gate section operable to be placed in alignment, and a third coupling pin receivable in said third set of aligned socket holes in said front section and in said gate section, and around the axis of which latter pin said gate section is adapted to have a swinging movement relatively to said front bucket section, the release or withdrawal of said third pin from said third set of socket holes permitting a relative degree of uncoupling of said gate section from said front section.

2. In load handling apparatus adapted to be carried by a self-propelled vehicle including lifting and lowering means on which said load handling apparatus is mounted, said load handling apparatus comprising a first rearwardly disposed grappling section, a second forwardly disposed grappling section, means pivotally connecting said first and second sections together adjacent their upper end and power actuated extensible means between said sections for effecting relative opening and closing movement therebetween, each said first and second sections having their opposed sides comprising a grappling jaw facing a cooperating grappling jaw carried by the other section, the grappling jaws of one said section comprising teeth spaced longitudinally of said sides a third grappling section having a load engaging side, and releasable means by which said third section is connectable to one of said first and second sections so as to be located between the two sections and with its load engaging side facing the grappling jaw of the other of said first and second sections.

3. In load handling apparatus for mounting on a vehicle of the class described, the combination of a rear grappling section, a front bucket section, means connecting said sections together for relative opening and closing movements therebetween, a hydraulic power means for effecting such opening and closing movements, first and second vertically spaced sets of socket holes in said rear section, a third set of socket holes intermediately disposed in said front section, and releasable coupling pivot pins receivable in said aligned sets of socket holes in said rear section and in said front section for releasably coupling a load engaging section to at least one of said rear and front sections.

4. In load handling apparatus for mounting on a vehicle of the class described, the combination of a rear grappling section, a front bucket section, means connecting said sections together for relative opening and closing movements therebetween, a hydraulic power means for effecting such opening and closing movements, a third section having a load engaging part, first and second vertically spaced sets of socket holes in said rear section and in said third section operable to be placed in alignment, and releasable coupling pivot pins receivable in said aligned sets of socket holes in said rear section and in said third section for releasably coupling said third section to said rear section, the construction being such that the release of both of said pins from both sets of socket holes permits complete uncoupling between said sections, and the release of only one of said pins permits relative pivotal movement between said sections and around the pivot axis of the other pin.

5. In material handling apparatus adapted for mounting on a self-propelled vehicle, said material handling apparatus comprising in combination a material handling unit, power-operated lifting and lowering supporting arm means on which said material handling unit is tiltably mounted, power operated tilting means for tilting said material handling unit relatively to said lifting and lowering arm means, said material handling unit being of multiple section construction including including a front material handling section having front and rear openings, an intermediate material handling section and a rear material handling section, pivot means connecting said front and rear sections together adjacent their upper ends for relative opening and closing movements therebetween, a first power means for effecting such opening and closing movements, releasable pivot means extending through aligned openings provided midway of the top and bottom of said front and intermediate sections pivotally connecting the intermediate section to the front section whereby it may be swung thereabout into overlying relation selectively with the front and rear openings of said front section, said intermediate section including a grappling jaw for cooperation with the rear section when located over the rear opening of the front section and a curved backwall which encloses the front opening of the front section when swung to a position thereover, and further power means for effecting swinging of said intermediate section to positions over said front and rear openings of the front section.

6. The combination defined in claim 5 further including removable pin means extendable through aligned openings in said rear and intermediate sections by which said intermediate section may be releasably connected to the rear section.

7. The combination defined in claim 5 including removable pin means extendable through alignable openings in said rear and intermediate section whereby the intermediate section is pivotable thereabout by operation of said further power means upon releasing the pivot means connecting said intermediate section to the front section.

References Cited
UNITED STATES PATENTS

| | | | |
|---|---|---|---|
| 2,326,338 | 8/1943 | Drott et al. | 37—117.5 |
| 2,375,205 | 5/1945 | Barras. | |
| 2,500,887 | 3/1950 | Trissler | 37—117.5 |
| 2,502,681 | 4/1950 | Swanson | 37—117.5 |
| 2,594,763 | 4/1952 | Freyer | 37—184 |
| 2,717,704 | 9/1955 | Pilch | 37—117.5 X |
| 2,746,624 | 5/1956 | Stueland | 214—131 |
| 2,783,903 | 3/1957 | Beyerstedt | 214—140 |
| 2,812,595 | 11/1957 | Drott. | |
| 2,883,772 | 4/1959 | Dodge | 37—117.5 |
| 2,903,803 | 9/1959 | Austin | 37—117.5 |
| 2,924,345 | 2/1960 | Bodin | 37—117.5 X |
| 2,958,434 | 11/1960 | Wagner | 214—147 X |
| 3,075,661 | 1/1963 | Knutson | 214—140 |
| 3,077,999 | 2/1963 | Svoboda | 37—117.5 X |
| 3,148,465 | 9/1964 | Beyerstedt et al. | 37—117.5 |
| 3,182,831 | 5/1965 | Bergmann | 214—140 |
| 3,250,028 | 5/1966 | Hunger et al. | 37—117.5 |

ABRAHAM G. STONE, *Primary Examiner.*

ANTONIO F. GUIDA, *Examiner.*

R. L. HOLLISTER, *Assistant Examiner.*